(12) United States Patent
Yang et al.

(10) Patent No.: US 12,386,584 B2
(45) Date of Patent: Aug. 12, 2025

(54) SOUND RECORDING METHOD AND APPARATUS

(71) Applicant: Honor Device Co., Ltd., Shenzhen (CN)

(72) Inventors: Xiao Yang, Beijing (CN); Jianyong Xuan, Beijing (CN); Zhenyi Liu, Beijing (CN); Yuanyou Wu, Beijing (CN); Shengwei Zhang, Beijing (CN); Jianfei Chu, Beijing (CN); Chienfeng Yeh, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/909,382

(22) PCT Filed: Apr. 21, 2022

(86) PCT No.: PCT/CN2022/088074
§ 371 (c)(1),
(2) Date: Sep. 4, 2022

(87) PCT Pub. No.: WO2022/262410
PCT Pub. Date: Dec. 22, 2022

(65) Prior Publication Data
US 2024/0201944 A1    Jun. 20, 2024

(30) Foreign Application Priority Data
Jun. 15, 2021   (CN) .......................... 202110663657.6

(51) Int. Cl.
*G06F 3/0482* (2013.01)
*G06F 3/16* (2006.01)

(52) U.S. Cl.
CPC ............ *G06F 3/167* (2013.01); *G06F 3/0482* (2013.01); *G06F 3/162* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 6,084,582 | A * | 7/2000 | Qureshi ............. | H04N 1/32144 715/243 |
| 6,259,391 | B1 * | 7/2001 | Pakravan .............. | H03M 1/185 455/234.1 |

(Continued)

FOREIGN PATENT DOCUMENTS

| CN | 105094808 A | 11/2015 |
|---|---|---|
| CN | 106160687 A | 11/2016 |

(Continued)

OTHER PUBLICATIONS

Apple's Voice Memos App version 2.1 screenshots, Voice Memos App available on Jan. 1, 2021, date availability provided at <https://www.reddit.com/r/CatalinaPatcher/comments/kod1r6/keynote_1038_cannot_play_slides_on_catalina_patch/> (Year: 2021).*

(Continued)

*Primary Examiner* — Daniel Rodriguez
(74) *Attorney, Agent, or Firm* — WOMBLE BOND DICKINSON (US) LLP

(57) ABSTRACT

Embodiments of the present invention provide a sound recording method and apparatus. The method includes: displaying, by a terminal device, a first interface, where the first interface includes a first control, and the first control includes: a first option used for selecting a recording whose output specification is sound quality with a first bit width, and a second option used for selecting a recording whose output specification is sound quality of a second bit width; and processing, by the terminal device in a case that the terminal device receives an operation of selecting the first option, a recording obtained by a microphone, to obtain a recording with the first bit width; or processing, by the (Continued)

terminal device in a case that the terminal device receives an operation of selecting the second option, a recording obtained by a microphone, to obtain a recording with the second bit width.

20 Claims, 14 Drawing Sheets

(56) References Cited

U.S. PATENT DOCUMENTS

| | | | | |
|---|---|---|---|---|
| 6,802,041 | B1* | 10/2004 | Rehm | G06F 16/48 |
| | | | | 715/728 |
| 7,562,097 | B2* | 7/2009 | Shinozaki | G11B 27/034 |
| | | | | 707/999.102 |
| 9,009,592 | B2* | 4/2015 | Friend | G06Q 10/00 |
| | | | | 715/728 |
| 9,800,217 | B1* | 10/2017 | Gandolfi | H03F 3/45475 |
| 9,946,510 | B2* | 4/2018 | Namgung | G06F 3/04162 |
| 2003/0025676 | A1* | 2/2003 | Cappendijk | G06F 3/04886 |
| | | | | 345/173 |
| 2005/0120373 | A1* | 6/2005 | Thomas | H04N 5/76 |
| | | | | 386/230 |
| 2007/0204225 | A1* | 8/2007 | Berkowitz | G11B 19/025 |
| | | | | 715/771 |
| 2009/0319260 | A1* | 12/2009 | Kong | H03H 17/045 |
| | | | | 704/201 |
| 2010/0077022 | A1* | 3/2010 | Mikkelsen | H04L 67/04 |
| | | | | 705/26.1 |
| 2013/0047083 | A1* | 2/2013 | Sansom | H04N 21/4725 |
| | | | | 715/764 |
| 2013/0311178 | A1* | 11/2013 | Lee | G06F 3/04883 |
| | | | | 704/235 |
| 2014/0089805 | A1* | 3/2014 | Song | G06Q 10/109 |
| | | | | 715/727 |
| 2015/0162008 | A1* | 6/2015 | Villette | G10L 21/038 |
| | | | | 704/500 |
| 2016/0004679 | A1* | 1/2016 | Grimm | G06F 40/20 |
| | | | | 715/753 |
| 2019/0012059 | A1* | 1/2019 | Kwon | G06F 3/0481 |
| 2019/0098398 | A1* | 3/2019 | Yliaho | H04R 3/00 |
| 2020/0379724 | A1 | 12/2020 | Kim et al. | |

FOREIGN PATENT DOCUMENTS

| | | |
|---|---|---|
| CN | 106953962 A | 7/2017 |
| CN | 107092461 A | 8/2017 |
| CN | 110097897 A | 8/2019 |
| CN | 112333606 A | 2/2021 |
| CN | 113726940 A | 11/2021 |
| KR | 20180020702 A | 2/2018 |

OTHER PUBLICATIONS

App Store, "Transcribe Recorder—Memo", archived on Jan. 15, 2021 at << https://web.archive.org/>>, available at <<https://apps.apple.com/us/app/transcribe-recorder-memo/id1472334093>>, 3 pages (Year: 2021).*

Time Fisher, "How to Use the Google Voice Recorder App on Android", archived on Nov. 1, 2020 at <<https://web.archive.org/>>, available at <<https://www.lifewire.com/google-voice-recorder-4778821>>, 2 pages (Year: 2020).*

Susanne Kraft, "How to Record Audio with your Phone", available Feb. 10, 2021, available at <<https://qual.wikis.its.utexas.edu/display/comm/How+to+Record+Audio+with+your+Phone#:~:text=To%20get%20the%20highest%20quality,Audio%20Quality%20and%20select%20LOSSLESS>>, 11 pages (Year: 2021).*

* cited by examiner

SOUND RECORDING METHOD AND APPARATUS

CROSS-REFERENCE TO RELATED APPLICATIONS

This application is a National Stage of International Application No. PCT/CN2022/088074, filed Apr. 21, 2022, which claims priority to Chinese Patent Application No. 202110663657.6, filed Jun. 15, 2021, both of which are hereby incorporated by reference in their entireties.

TECHNICAL FIELD

This application relates to the field of terminal technologies, and in particular, to a sound recording method and apparatus.

BACKGROUND

Currently, with the development of terminal technologies, functional requirements of users for terminal devices are becoming more and more diversified. To meet requirements of the users for sound recording, many terminal devices support functions such as sound recording or video recording.

Generally, when a terminal device is used for implementing the recording function, the terminal device may receive a sound signal in an environment based on a microphone, convert the sound signal into an electrical signal, and store the electrical signal in a memory.

However, when the sound signal in the environment is too large or too small, it is difficult for the terminal device to obtain a good sound recording effect.

SUMMARY

Embodiments of this application provide a sound recording method and apparatus, and a terminal device can implement flexible adjustment of a signal gain, thereby obtaining a better sound recording effect.

According to a first aspect, an embodiment of this application provides a sound recording method, a terminal device includes a microphone, and the method includes: displaying, by the terminal device, a first interface, where the first interface includes a first control, and the first control includes: a first option used for selecting a recording whose output specification is sound quality with a first bit width, and a second option used for selecting a recording whose output specification is sound quality of a second bit width; and processing, by the terminal device in a case that the terminal device receives an operation of selecting the first option, a recording obtained by the microphone, to obtain a recording with the first bit width; or processing, by the terminal device in a case that the terminal device receives an operation of selecting the second option, a recording obtained by the microphone, to obtain a recording with the second bit width. In this way, the terminal device can provide a user with a variety of recording sound quality options, so that the user can flexibly select an appropriate recording sound quality according to requirements.

The first interface may be an interface corresponding to selecting recording sound quality, the first control may be a recording sound quality option, the first option may be an option corresponding to standard sound quality, and the second option may be an option corresponding to high-definition sound quality.

In a possible implementation, the method further includes: displaying, by the terminal device, a second interface, where the second interface includes a second control; receiving, by the terminal device, a first operation for the second control, displaying, by the terminal device, a third interface in response to the first operation, where the third interface includes a third control; receiving, by the terminal device, a second operation for the third control; and the displaying, by the terminal device, a first interface includes: displaying, by the terminal device, the first interface in response to the second operation. In this way, the terminal device can enable setting of the recording sound quality by receiving triggering of the user for a function in sound recording, so that the terminal device can implement flexible setting of the user for the recording sound quality.

The second interface may be an interface displayed when a sound recording application is opened, the second control may be a control used for enabling more functions corresponding to the sound recording application, and the first operation may be an operation of triggering the control used for enabling more functions corresponding to the sound recording application. The third interface may an interface displayed when the control used for enabling more functions corresponding to the sound recording application is triggered, the third control may be a control used for setting recording sound quality, and the second operation may be triggering the control used for setting the recording sound quality.

In a possible implementation, the second interface further includes a fourth control, and the processing, by the terminal device, a recording obtained by the microphone, to obtain a recording with the first bit width includes: receiving, by the terminal device, a third operation for the fourth control; and processing, by the terminal device in response to the third operation, the recording obtained by the microphone, to obtain the recording with the first bit width. In this way, the terminal device implements sound recording based on the recording sound quality set by the user and the triggering of the recording control.

The fourth control may be a control used for enabling recording sound quality, and the third operation may be an operation of triggering the control used for enabling the recording sound quality.

In a possible implementation, the third interface further includes: a fifth control configured to implement a speech-to-text service, a sixth control configured to implement sorting of recording files, and a seventh control configured to view information about a sound recording application that are displayed in the form of a list.

In a possible implementation, the second interface further includes a recording file, a first identifier corresponding to the recording file is displayed around the recording file, and the first identifier is used for identifying a sound quality type of the recording file. In this way, the user can easily know the sound quality type of the current recording file through the first identifier.

In a possible implementation, the method further includes: receiving, by the terminal device, a fourth operation for the recording file; and displaying, by the terminal device, a fourth interface in response to the fourth operation, where the fourth interface includes a recording play back identifier and a second identifier, the second identifier is used for identifying an audio type of the recording file, and the second identifier and the first identifier are different. In this way, the user can easily know the sound quality type of the current recording file through the first identifier.

The fourth operation may be an operation of opening the recording file, and the fourth interface may an interface corresponding to the opened recording file.

In a possible implementation, the method further includes: displaying, by the terminal device, a fifth interface, where the fifth interface includes an eighth control, and receiving, by the terminal device, a fifth operation for the eighth control; and the displaying, by the terminal device, a first interface includes: displaying, by the terminal device, the first interface in response to the fifth operation.

The fifth interface may be an interface displayed when a sound recording application is opened, the eighth control may be a control used for starting a recording, and the fifth operation may be an operation corresponding to triggering the control used for starting the recording.

In a possible implementation, the terminal device further includes a codec CODEC, and the processing, by the terminal device, a recording obtained by the microphone, to obtain a recording with the first bit width includes: processing, by the terminal device based on the second bit width, the recording obtained by the microphone, to obtain a processed first signal, where the second bit width is a bit width defaulted by the terminal device; and converting, by the terminal device, the first signal into a signal corresponding to the first bit width, to obtain the recording with the first bit width; or converting, by the terminal device based on the second bit width, the recording obtained by the microphone into a signal corresponding to the first bit width in the CODEC; and processing, by the terminal device, the signal corresponding to the first bit width, to obtain the recording with the first bit width. In this way, the terminal device can reduce, based on analog gain adjustment, distortion caused by clipping in the MIC when an environmental sound pressure level is higher, and amplify the sound when the environmental sound pressure level is lower, to extend a dynamic range of the signal, thereby obtaining a better sound recording effect.

First amplitude information may be a short-term signal amplitude, and first analog gain information may be an analog gain corresponding to the short-term signal amplitude. A correspondence between the first amplitude information the first analog gain information may be obtained from an adjustment policy table.

In a possible implementation, the processing, by the terminal device based on the second bit width, the recording obtained by the microphone, to obtain a processed first signal includes: inputting, by the terminal device based on the second bit width, the recording obtained by the microphone into the CODEC, to obtain a digital signal corresponding to the recording obtained by the microphone; calculating, by the terminal device, first amplitude information of the digital signal; obtaining, by the terminal device according to a correspondence between the first amplitude information and first analog gain information, the first analog gain information corresponding to the first amplitude information; and performing, by the terminal device based on the first analog gain information, analog gain adjustment on the digital signal, to obtain the processed first signal. In this way, the terminal device can process the signal based on a bit width set by the user, thereby obtaining a better sound recording effect.

In a possible implementation, the calculating, by the terminal device, first amplitude information of the digital signal includes: converting, by the terminal device using fast Fourier transformation FFT, the digital signal into a frequency domain signal; filtering, by the terminal device, the frequency domain signal, to obtain a filtered signal; calculating, by the terminal device, an amplitude spectrum corresponding to the filtered signal; and calculating, by the terminal device based on a first time length, the first amplitude information of the digital signal. In this way, because the environmental sound pressure level can change fast as the time changes and a longer measurement time indicates less measurement accuracy, the terminal device can identify the change of the environmental sound pressure level by using the short-term signal amplitude.

In a possible implementation, the processing, by the terminal device based on the second bit width, the recording obtained by the microphone, to obtain a processed first signal includes: inputting, by the terminal device based on the second bit width, the recording obtained by the microphone into the CODEC, to obtain a digital signal corresponding to the recording obtained by the microphone; determining, by the terminal device, a type of the digital signal based on long-term power of the digital signal and a quantity of sampling points in the digital signal that exceed a first amplitude threshold or a second amplitude threshold; determining, by the terminal device according to a correspondence between the type of the digital signal and second analog gain information, the second analog gain information corresponding to the type of the digital signal; processing, by the terminal device based on the second analog gain information, the recording obtained by the microphone, to obtain a digital signal after analog gain processing; determining, by the terminal device, digital gain information corresponding to the digital signal according to a difference between the second analog gain information and initial analog gain information of the digital signal; and performing, by the terminal device based on the digital gain information, the digital signal after analog gain processing, to obtain the processed first signal. In this way, the terminal device can reduce, based on analog gain and digital gain adjustment, distortion caused by clipping in the MIC when an environmental sound pressure level is higher, and amplify the sound when the environmental sound pressure level is lower, to extend a dynamic range of the signal, thereby obtaining a better sound recording effect.

In a possible implementation, the type of the digital signal includes a first type of digital signal, a second type of digital signal, and a third type of digital signal; the first type of digital signal is a signal that meets a first condition; the second type of digital signal is a signal that meets a second condition; the third type of digital signal is a signal that does not meet the second condition; the first condition is that a quantity of sampling points greater than the first amplitude threshold in the digital signal is greater than a first count threshold; and the second condition is that a quantity of sampling points greater than the second amplitude threshold in the digital signal is greater than a second count threshold, and the long-term power of the digital signal is greater than first long-term power threshold.

The first type of digital signal may be a short-term clipped large signal, the second type of digital signal may be a long-term large signal, and the third type of digital signal may be a long-term small signal. The first amplitude threshold may be referred to as a first clipping threshold, and the second amplitude threshold may be referred to as a second clipping threshold.

In a possible implementation, the first bit width is 16 bits, and the second bit width is 24 bits or 32 bits.

In a possible implementation, the terminal device includes a sound recording algorithm module and a CODEC, and the processing, by the terminal device in a case that the terminal device receives an operation of selecting the first option, the recording obtained by the microphone, to obtain the recording with the first bit width includes: issuing, by the terminal device in a case that the terminal device receives the operation of selecting the first option, a first instruction to the sound recording algorithm module and/or the CODEC based on a format of a recording file and the operation of selecting the first option; and processing, by the sound recording algorithm module and/or the CODEC of the terminal device based on the first instruction, the recording obtained by the microphone, to obtain the recording with the first bit width.

According to a second aspect, an embodiment of this application provides a sound recording apparatus, a terminal device includes a microphone, and the apparatus includes: a display unit, configured to display a first interface, where the first interface includes a first control, and the first control includes: a first option used for selecting a recording whose output specification is sound quality with a first bit width, and a second option used for selecting a recording whose output specification is sound quality of a second bit width; and a processing unit, configured to process, in a case that the terminal device receives an operation of selecting the first option, a recording obtained by the microphone, to obtain a recording with the first bit width; or a processing unit, configured to process, in a case that the terminal device receives an operation of selecting the second option, a recording obtained by the microphone, to obtain a recording with the second bit width.

In a possible implementation, the display unit is further configured to display a second interface, where the second interface includes a second control; the processing unit is further configured to receive a first operation for the second control; the display unit is further configured to display a third interface in response to the first operation, where the third interface includes a third control; the processing unit is further configured to receive a second operation for the third control; and the display unit is further configured to display the first interface in response to the second operation.

In a possible implementation, the second interface further includes a fourth control, and the processing unit is specifically configured to receive a third operation for the fourth control; and the processing unit is further specifically configured to process, in response to the third operation, the recording obtained by the microphone, to obtain the recording with the first bit width.

In a possible implementation, the third interface further includes: a fifth control configured to implement a speech-to-text service, a sixth control configured to implement sorting of recording files, and a seventh control configured to view information about a sound recording application that are displayed in the form of a list.

In a possible implementation, the second interface further includes a recording file, a first identifier corresponding to the recording file is displayed around the recording file, and the first identifier is used for identifying a sound quality type of the recording file.

In a possible implementation, the processing unit is further configured to receive a fourth operation for the recording file; and the display unit is further configured to display a fourth interface in response to the fourth operation, where the fourth interface includes a recording play back identifier and a second identifier, the second identifier is used for identifying an audio type of the recording file, and the second identifier and the first identifier are different.

In a possible implementation, the display unit is further configured to display a fifth interface, where the fifth interface includes an eighth control; the processing unit is further configured to receive a fifth operation for the eighth control; and the display unit is further configured to display, in response to the fifth operation, the first interface.

In a possible implementation, the terminal device further includes a codec CODEC, and the processing unit is specifically configured to: process, based on the second bit width, the recording obtained by the microphone, to obtain a processed first signal, where the second bit width is a bit width defaulted by the terminal device; and convert the first signal into a signal corresponding to the first bit width, to obtain the recording with the first bit width; or convert, based on the second bit width, the recording obtained by the microphone into a signal corresponding to the first bit width in the CODEC; and process the signal corresponding to the first bit width, to obtain the recording with the first bit width.

In a possible implementation, the processing unit is specifically configured to: input, based on the second bit width, the recording obtained by the microphone into the CODEC, to obtain a digital signal corresponding to the recording obtained by the microphone; calculate first amplitude information of the digital signal; obtain, according to a correspondence between the first amplitude information and first analog gain information, the first analog gain information corresponding to the first amplitude information; and perform, based on the first analog gain information, analog gain adjustment on the digital signal, to obtain the processed first signal.

In a possible implementation, the processing unit is specifically configured to: convert, by using fast Fourier transformation FFT, the digital signal into a frequency domain signal; filter the frequency domain signal, to obtain a filtered signal; calculate an amplitude spectrum corresponding to the filtered signal; and calculate, based on a first time length, the first amplitude information of the digital signal.

In a possible implementation, the processing unit is specifically configured to: input, based on the second bit width, the recording obtained by the microphone into the CODEC, to obtain a digital signal corresponding to the recording obtained by the microphone; determine a type of the digital signal based on long-term power of the digital signal and a quantity of sampling points in the digital signal that exceed a first amplitude threshold or a second amplitude threshold; determine, according to a correspondence between the type of the digital signal and second analog gain information, the second analog gain information corresponding to the type of the digital signal; process, based on the second analog gain information, the recording obtained by the microphone, to obtain a digital signal after analog gain processing; determine digital gain information corresponding to the digital signal according to a difference between the second analog gain information and initial analog gain information of the digital signal; and perform, based on the digital gain information, the digital signal after analog gain processing, to obtain the processed first signal.

In a possible implementation, the type of the digital signal includes a first type of digital signal, a second type of digital signal, and a third type of digital signal; the first type of digital signal is a signal that meets a first condition; the second type of digital signal is a signal that meets a second condition; the third type of digital signal is a signal that does not meet the second condition; the first condition is that a quantity of sampling points greater than the first amplitude threshold in the digital signal is greater than a first count threshold; and the second condition is that a quantity of sampling points greater than the second amplitude threshold in the digital signal is greater than a second count threshold, and the long-term power of the digital signal is greater than first long-term power threshold.

In a possible implementation, the first bit width is 16 bits, and the second bit width is 24 bits or 32 bits.

In a possible implementation, the terminal device includes a sound recording algorithm module and a CODEC, and the processing unit is specifically configured to: issue, by the terminal device, in a case that the terminal device receives the operation of selecting the first option, a first instruction to the sound recording algorithm module and/or the CODEC based on a format of a recording file and the operation of selecting the first option; and process, based on the first instruction, the recording obtained by the microphone, to obtain the recording with the first bit width.

According to a third aspect, an embodiment of this application provides a sound recording apparatus, including a processor and a memory, where the memory is configured to store code instructions; and the processor is configured to run the code instructions, causing an electronic device to perform the sound recording method according to the first aspect or any one of implementations of the first aspect.

According to a fourth aspect, an embodiment of this application provides a computer-readable storage medium. The computer-readable storage medium stores instructions. The instructions, when executed, cause a computer to perform the sound recording method according to the first aspect or any one of implementations of the first aspect.

According to a fifth aspect, a computer program product is provided, including a computer program, The computer program, when run, causes a computer to perform the sound recording method according to the first aspect or any one of implementations of the first aspect.

It should be understood that, the technical solutions of the second aspect to the fifth aspect of this application correspond to those of the first aspect of this application, and the beneficial effects obtained by the aspects and the corresponding feasible implementations are similar, and details are not described again.

DESCRIPTION OF EMBODIMENTS

Figure 1:
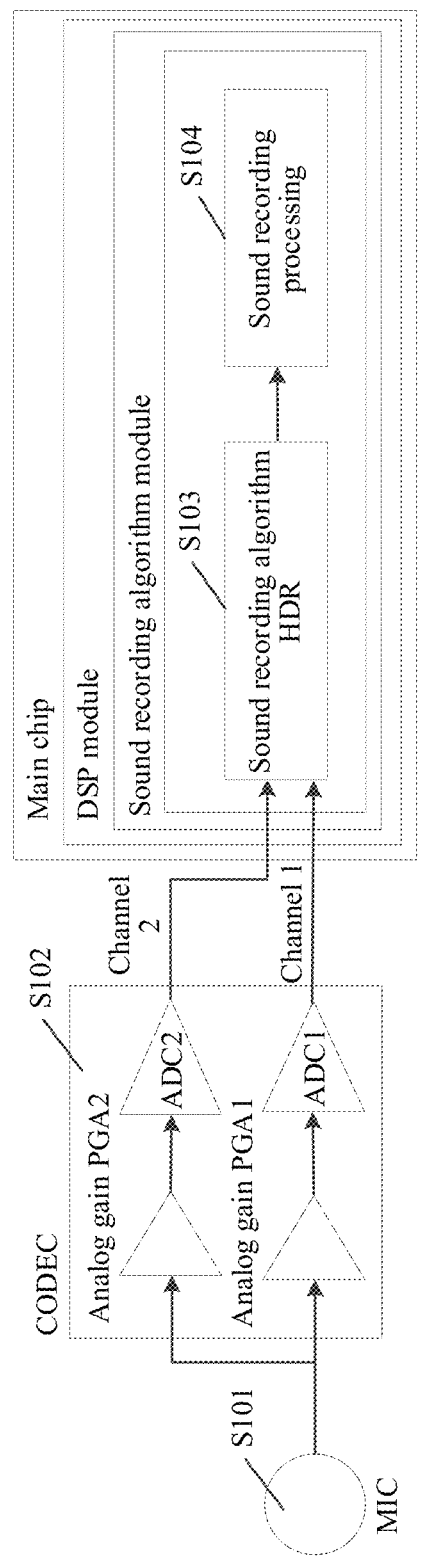
FIG. 1 is a schematic diagram of sound recording method in a possible implementation.

For ease of describing the technical solutions in the embodiments of this application clearly, in the embodiments of this application, terms such as "first" and "second" are used to distinguish same or similar items with a basically same function and role. For example, a first terminal device and a second terminal device are merely used to distinguish between different terminal devices, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this application, the terms, such as "exemplarily" and "for example", are used to represent giving an example, an illustration or a description. Any embodiment or design scheme described by using "exemplarily" or "for example" in this application should not be explained as being more preferred or having more advantages than another embodiment or design scheme. Exactly, use of the term, such as "exemplarily" or "for example", is intended to present a related concept in a specific manner.

In this application, "at least one" means one or more, and "a plurality of" means two or more. "And/or" describes an association relationship for describing associated objects and represents that three relationships may exist. For example, A and/or B may represent that: only A exists, both A and B exist, and only B exists, where A and B may be singular or plural. The character "/" generally indicates an "or" relationship between the associated objects. "At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

With the development of the terminal technologies, functions of terminal devices become increasingly comprehensive. For example, a recording function or a camera function in a terminal device has become one of indispensable functions in people's daily life.

However, recording parts in the recording function and the camera function of the terminal device have the following two main problems:

First, because a microphone in the terminal device may process a received sound signal to different degrees based on a volume of a sound in an environment (or may be understood as a rank of an environmental sound pressure level), and the processing process affects the sound recording effect of the terminal device. For example, when the environmental sound pressure level is too high, an analog signal outputted by the microphone may be clipped, resulting in the distortion of a recording. Then, after the terminal device performs analog gain processing on the clipped analog signal and converts the analog signal into a digital signal, the distortion caused by clipping may be further amplified. Alternatively, when the environmental sound pressure level is too low; an amplitude of the analog signal outputted by the microphone is relatively small and is easy to be masked by noise, so that the sound recording effect of the terminal device is further affected.

Second, more terminal devices use a 16-bit (bit) audio recording capability by default, and do not provide 24-bit/32-bit and other higher-standard lossless audio recording capabilities. Compared with a 16-bit recording sound quality, a 24-bit/32-bit recording sound quality is clearer.

To resolve the foregoing problems, in a possible implementation, a sound recording method is provided. Exemplarily. FIG. 1 is a schematic diagram of sound recording method in a possible implementation. As shown in FIG. 1, a terminal device implementing the sound recording method may include: a main chip and a codec (coder-decoder, CODEC). The main chip includes a digital signal processing (digital signal processing, DSP) module, the DSP module may include a sound recording algorithm module, and the sound recording algorithm module performs a sound recording algorithm HDR, sound recording processing, and the like. The CODEC may use two groups of programmable gain amplifier (programmable gain amplifier, PGA)+an analog-to-digital converter (analog-to-digital converter, ADC), and a specific method thereof may include the following steps:

S101. The terminal device obtains a sound signal in an environment based on a microphone (microphone, MIC), and converts the sound signal into an analog signal.

In this embodiment of this application, when a strength of the sound signal in the environment is larger, the MIC may perform clipping processing on the sound signal. There may be one or more MICs.

S102. The CODEC in the terminal device processes the analog signal, and outputs a digital signal corresponding to the analog signal.

In this embodiment of this application, the CODEC includes two groups of PGA+ADC, and forms two recording channels respectively. As shown in FIG. 1, analog gains PGA1 and ADC1 may form a channel 1, and a larger analog gain may be set on the PGA1 in the channel 1, to acquire a smaller signal in the analog signal. Analog gains PGA2 and ADC2 form a channel 2, and a smaller analog gain may be set on the PGA2 in the channel 2, to reduce the clipping influence and acquire a larger signal in the analog signal. The PGA1 and the PGA2 are configured to process, for example, amplify, convert, or filter the analog signal; and the ADC1 and the ADC2 are configured to convert the analog signal into a digital signal.

Exemplarily, when there are a plurality of MICs, each MIC may be used as an output of the channel 1 and the channel 2, or it may be understood that each MIC occupies the channel 1 and the channel 2.

S103. The terminal device analyzes, based on a high dynamic range (high dynamic range, HDR) of a sound recording algorithm, signal quality of the two channels in real time, and selects a digital signal in a channel with better signal quality.

Exemplarily, when the clipping of the channel 1 is serious, the terminal device may select the digital signal in the channel 2 for sound recording processing.

S104. Perform sound recording processing on the digital signal.

However, because the sound recording method in the steps shown in the above S101 to S104 uses the CODEC with dual PGA+ADC, more hardware resources are occupied, and it is difficult to support more MICs. For example, the device corresponding to the sound recording method generally includes five groups of PGA+ADC, and needs six groups of PGA+ADC when there are three microphones. Therefore, it is difficult to implement sound recording processing of more MICs.

In view of this, this embodiment of this application provides a sound recording method. A terminal device may increase a gain adjustment policy in a sound recording algorithm, perform, according to a situation of a current signal, flexible adjustment on an analog gain and/or digital gain of the signal, to extend a dynamic range of the signal, thereby reducing the influence of clipping processing in a microphone on the sound recording effect, and obtaining a better sound recording effect. Moreover, the terminal device can implement setting of the user on an outputted recording sound quality.

Figure 2:
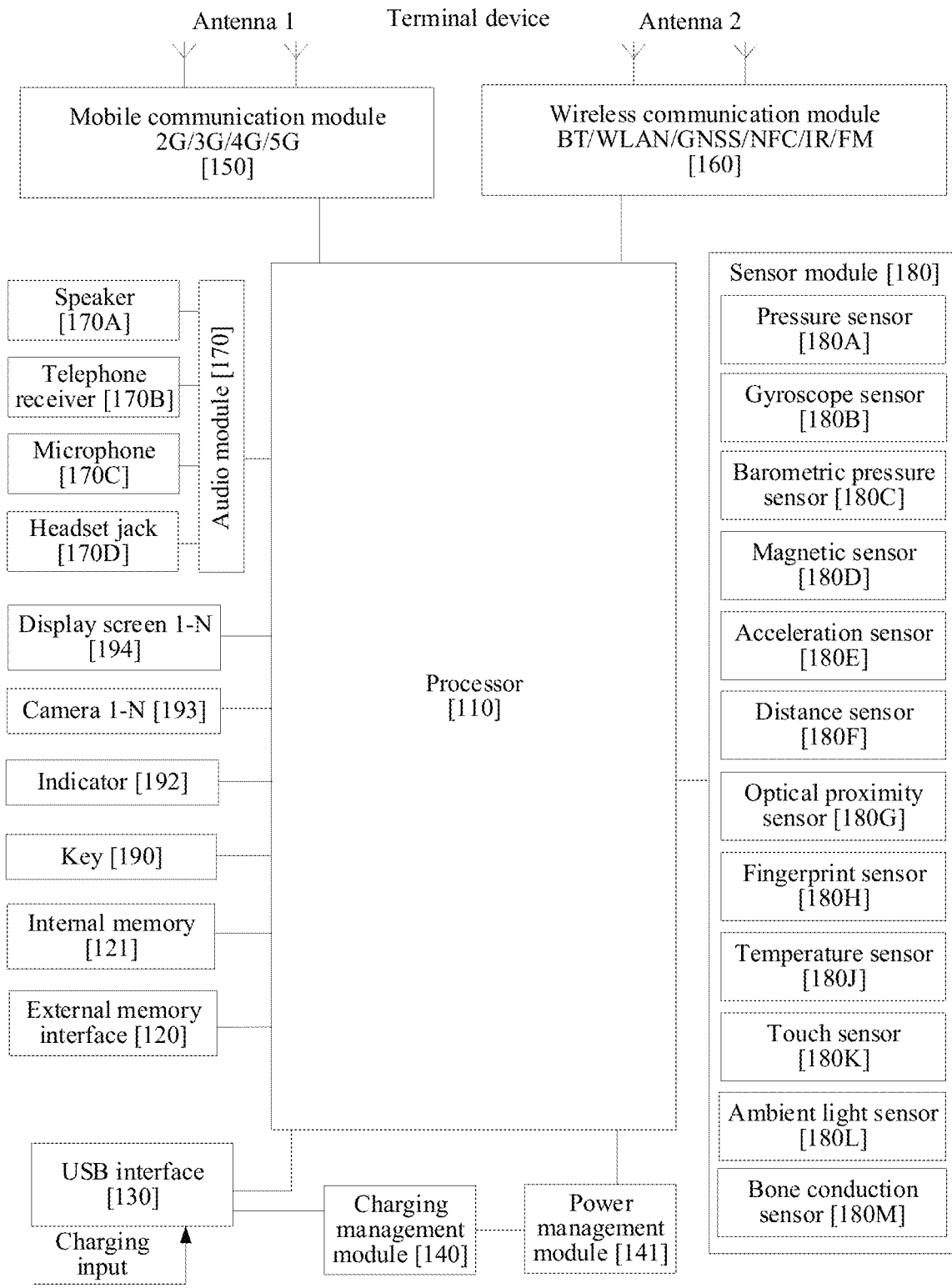
FIG. 2 is a schematic structural diagram of a terminal device according to an embodiment of this application.

It may be understood that, the above terminal device may also be referred to as a terminal (terminal), a user equipment (user equipment, UE), a mobile station (mobile station, MS), a mobile terminal (mobile terminal, MT), or the like. The terminal device may be a mobile phone (mobile phone), an intelligent television, a wearable device, a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self-driving (self-driving), a wireless terminal in remote medical care (remote medical), a wireless terminal in a smart grid (smart grid), a wireless terminal in transportation safety (transportation safety), a wireless terminal in a smart city (smart city), a wireless terminal in a smart home (smart home), or the like with a sound recording function and/or video recording function, and the like. The embodiments of this application impose no limitation on a specific technology and a specific device form used by the terminal device. Therefore, to make embodiments of this application more comprehensible, the following describes a structure of the terminal device in the embodiments of this application. Exemplarily. FIG. 2 is a schematic structural diagram of a terminal device according to an embodiment of this application.

The terminal device may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a telephone receiver 170B, a microphone 170C, a headset jack 170D, a sensor module 180, a key 190, an indicator 192, a camera 193, a display screen 194, and the like. The sensor module 180) may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of this application does not constitute a specific limitation on the terminal device. In some other embodiments of this application, the terminal device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. Different processing units may be independent components, or may be integrated into one or more processors. The processor 110 may be further configured with a memory, to store an instruction and data.

The USB interface 130 is an interface that conforms to a USB standard specification, and may be specifically a mini USB interface, a micro USB interface, a USB Type C interface, or the like. The USB interface 130 may be configured to connect to a charger to charge the terminal device, or may be used for data transmission between the terminal device and a peripheral device, or may also be connected to a headset to play audios through the headset. The interface may alternatively be configured to connect to another electronic device such as an AR device.

The charging management module 140 is configured to receive a charging input from the charger. The charger may be a wireless charger or a wired charger. The power management module 141 is configured to connect to the charging management module 140 and the processor 110.

A wireless communication function of the terminal device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. An antenna in the terminal device may be configured to cover a single communication frequency band or a plurality of communication frequency bands. Different antennas may also be multiplexed to improve utilization of the antennas.

The mobile communication module 150) may provide a solution for wireless communication including 2G/3G/4G/5G and the like to be applied to the terminal device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation.

The wireless communication module 160 may provide a solution for wireless communication including wireless local area networks (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), and the like to be applied to the terminal device.

The terminal device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render graphics.

The display screen 194 is configured to display an image, a video, and the like. The display screen 194 includes a display panel. In some embodiments, the terminal device may include one or N display screens 194, and N is a positive integer greater than 1.

The terminal device may implement a photographing function by using the ISP, the camera 193, the video codec, the GPU, the display screen 194, the application processor, and the like.

The camera 193 is configured to capture a static image or a video. In some embodiments, the terminal device may include one or N cameras 193, and N is a positive integer greater than 1.

The external memory interface 120 may be configured to connect to an external storage card such as a micro SD card, to extend a storage capability of the terminal device. The external storage card communicates with the processor 110 by using the external memory interface 120, to implement a data storage function, for example, storing a file such as a music or a video in the external storage card.

The internal memory 121 may be configured to store computer executable program code, where the executable program code includes an instruction. The internal memory 121 may include a program storage region and a data storage region.

The terminal device may implement an audio function, for example, music play back and recording, by using the audio module 170, the speaker 170A, the phone receiver 170B, the microphone 170C, the headset jack 170D, the application processor, and the like.

The audio module 170 is configured to convert digital audio information into an analog audio signal output, and is further configured to convert an analog audio input into a digital audio signal. The speaker 170A, also referred to as a "horn", is configured to convert an audio electrical signal into a sound signal. Music can be listened to or a hands-free call can be answered by using the speaker 170A in the terminal device. The phone receiver 170B, also referred to as a "receiver", is configured to convert an audio electrical signal into a sound signal. When a call is answered or audio information is listened to by using the terminal device, the phone receiver 170B may be put close to a human ear to listen to a voice. The headset jack 170D is configured to connect to a wired headset.

The microphone 170C, also referred to as a "mouthpiece" or a "megaphone", is configured to convert a sound signal into an electrical signal. In this embodiment of this application, one microphone 170C may be disposed in the terminal device. For example, when three microphones 170C are disposed on the terminal device and a recording function in the terminal device is enabled, the terminal device may respectively obtain audio signals in the three microphones 170C; and performs respectively analog gain and/or digital adjustment processing on the audio signals in the three microphones 170C. Further, the terminal device may combine processed three signals, to obtain a final sound recording processing result.

The pressure sensor 180A is configured to sense a pressure signal, and may convert the pressure signal into an electrical signal. In some embodiments, the pressure sensor 180A may be disposed in the display screen 194. The gyroscope sensor 180B may be configured to determine a motion posture of the terminal device. The barometric pressure sensor 180C is configured to measure barometric pressure. The magnetic sensor 180D includes a Hall sensor. The acceleration sensor 180E may detect magnitude of accelerations in various directions (generally on three axes)

of the terminal device. The distance sensor 180F is configured to measure a distance. The optical proximity sensor 180G may include, for example, a light-emitting diode (LED) and an optical detector such as a photodiode. The ambient light sensor 180L is configured to sense luminance of ambient light. The fingerprint sensor 180H is configured to collect a fingerprint. The temperature sensor 180J is configured to detect a temperature. The touch sensor 180K is also referred to as a "touch component". The touch sensor 180K may be disposed on the display screen 194. The touch sensor 180K and the display screen 194 form a touchscreen, which is also referred to as a "touch control screen". The bone conduction sensor 180M may obtain a vibration signal.

The key 190 includes a power key, a volume key, and the like. The key 190 may be a mechanical key, or a touch-type key. The terminal device may receive a key input, generate a key signal input related to a user setting and function control of the terminal device. The indicator 192 may be an indicator light, may be configured to indicate a charging state and a battery change, and may be further configured to indicate a message, a missed call, a notification, and the like.

A software system of the terminal device may use a layered architecture, an event-driven architecture, a micro-kernel architecture, a micro service architecture, or a cloud architecture like. Details are not described herein again.

The following describes the technical solutions of this application and how to resolve the foregoing technical problems according to the technical solutions of this application in detail by using specific embodiments. The following several specific embodiments may be independently implemented, and may also be combined with each other, and the same or similar concepts or processes may not be described repeatedly in some embodiments.

In this embodiment of this application, the terminal device may perform recording based on recording sound quality set by a user. Exemplarily, the method for setting recording sound quality by a user may include the following two types. Method 1: The user may first select recording sound quality during recording, and then trigger a recording control to perform sound recording (for example, an embodiment corresponding to FIG. 3A and FIG. 3B). Method 2: The user may first trigger a recording control, and then select recording sound quality during recording to perform sound recording (an embodiment corresponding to FIG. 4).

Method 1: The user may first select the recording sound quality during recording, and then trigger the recording control to perform sound recording.

Figure 3A:
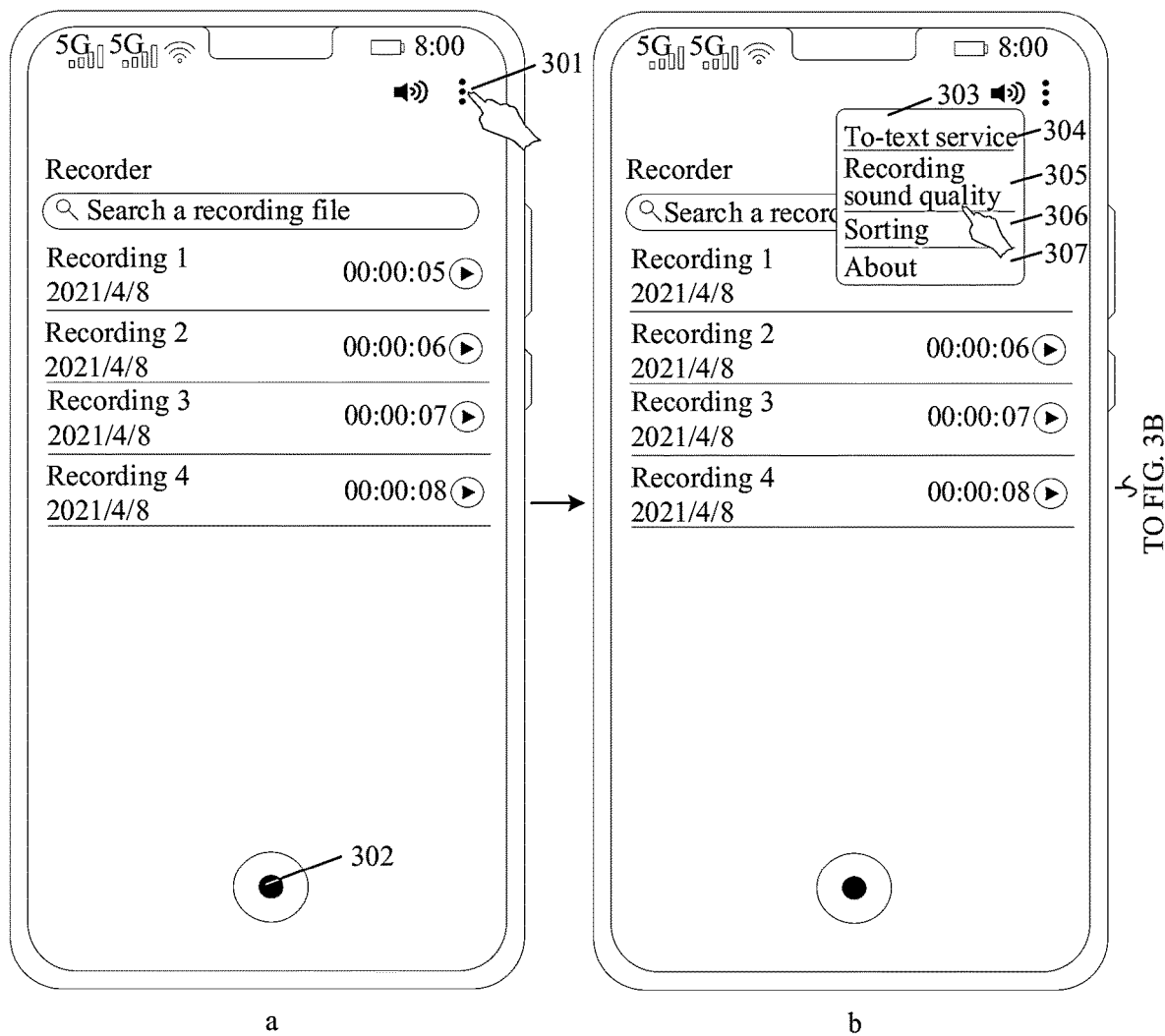
FIG. 3A and FIG. 3B are a schematic diagram of an interface of setting recording sound quality according to an embodiment of this application.
Figure 3B:
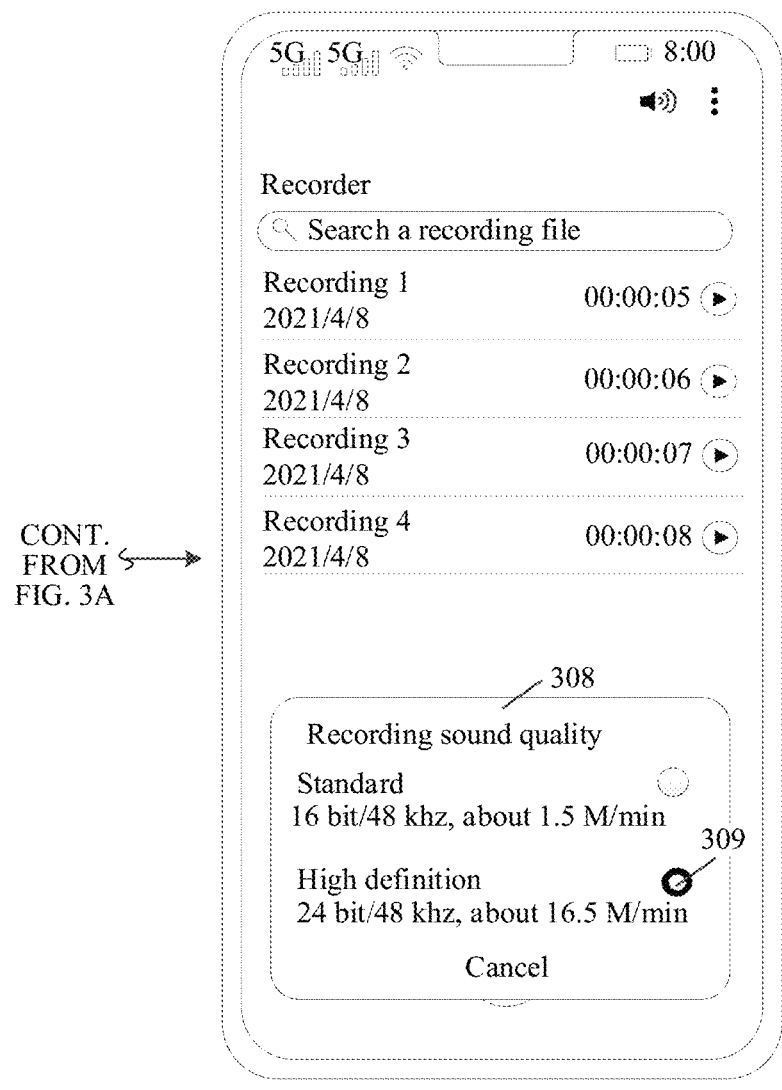

Exemplarily, FIG. 3A and FIG. 3B are a schematic diagram of an interface of setting recording sound quality according to an embodiment of this application. In the embodiment corresponding to FIG. 3A and FIG. 3B, exemplary descriptions are made by using an example in which the terminal device is a mobile phone, and this example does not constitute a limitation to the embodiments of this application.

When the terminal device receives an operation of which the user opens a sound recording application (application, APP), the terminal device may display an interface shown in a of FIG. 3A, and the interface may include: a more control 301 for enabling more functions, a speaker control, an input box corresponding to searching a recording file, a plurality of recording files, a recording enabling control 302, and the like. The plurality of recording files include: a recording 1, a recording 2, a recording 3, a recording 4, and the like. A recording time, a recording duration, and a recording play back control corresponding to each recording file are displayed around the each recording file.

In the interface shown in a of FIG. 3A, when the terminal device receives an operation of which the user triggers the more control 301, the terminal device may display an interface shown in b of FIG. 3A, and the interface may include a prompt box 303 and the like. The prompt box 303 includes: a to-text service control 304, recording sound quality control 305, a sorting control 306, an about control 307, and the like. The recording sound quality control 305 is configured to set sound quality of an outputted recording.

In the interface shown in b of FIG. 3A, when the terminal device receives an operation of which the user triggers the recording sound quality control 305, the terminal device may display an interface shown in c of FIG. 3B, and the interface may include a recording sound quality option 308 and the like. The recording sound quality option 308 may display: a standard sound quality option, a high-definition sound quality option 309, a cancel control, and the like. The standard sound quality may be 16 bit/48 kilohertz (khz), about 1.5 megabytes (M)/min. The high-definition sound quality may be 24 bit/48 khz, about 16.5 M/min.

In the interface shown in c of FIG. 3B, when the terminal device receives an operation of which the user triggers the high-definition sound quality option 309, the terminal device may store the recording sound quality selected by the user. Further, in the interface shown in a of FIG. 3A, when the terminal device receives an operation of which the user triggers the recording enabling control 302, the terminal device may perform recording according to the recording sound quality selected by the user.

Figure 4:
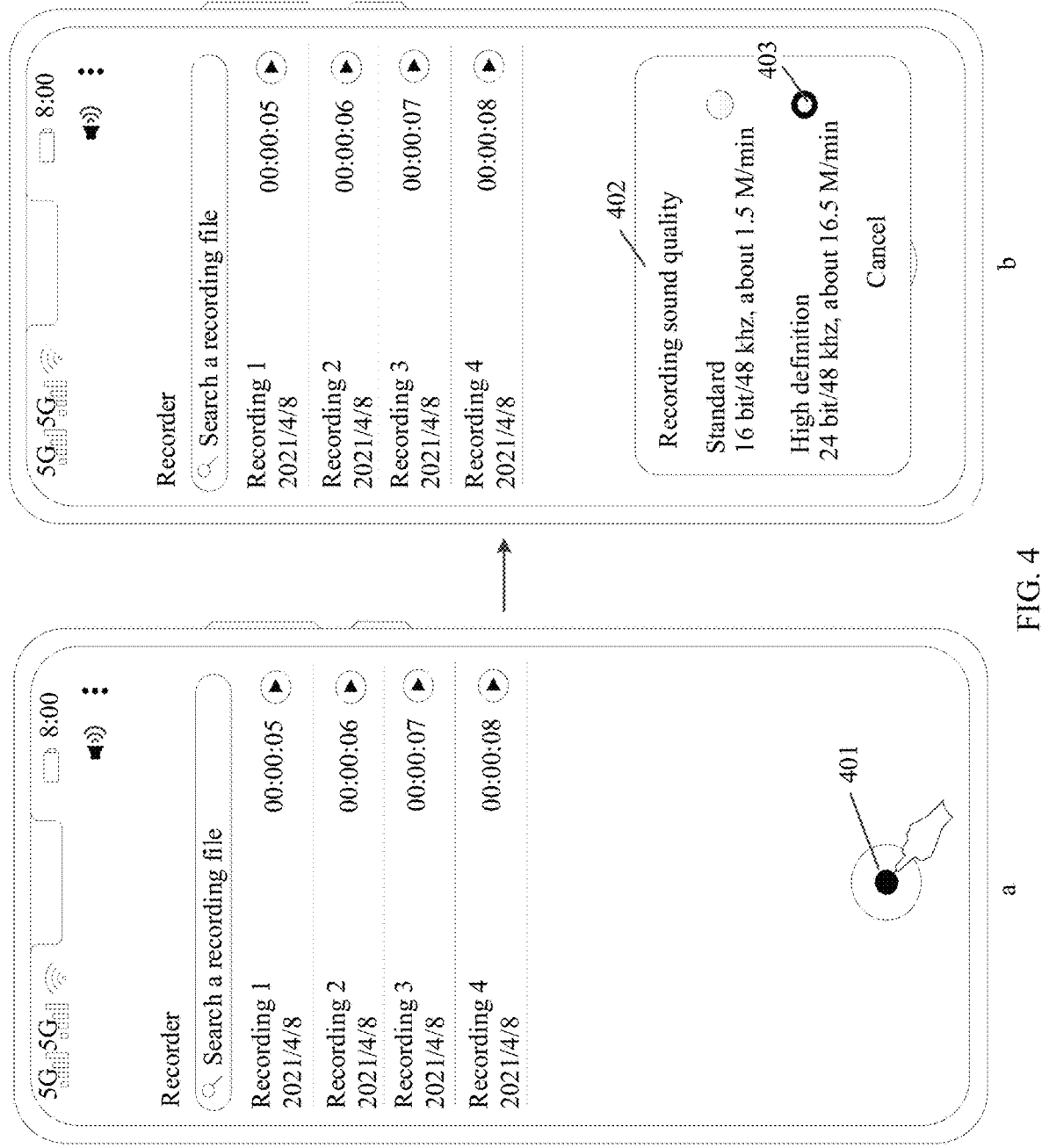
FIG. 4 is a schematic diagram of another interface of setting recording sound quality according to an embodiment of this application.

Method 2: The user may first trigger a recording control, and then select recording sound quality during recording to perform sound recording. Exemplarily, FIG. 4 is a schematic diagram of another interface of setting recording sound quality according to an embodiment of this application. In the embodiment corresponding to FIG. 4, exemplary descriptions are made by using an example in which the terminal device is a mobile phone, and this example does not constitute a limitation to the embodiments of this application.

When the terminal device receives an operation of which the user opens a sound recording APP, the terminal device may display an interface shown in a of FIG. 4, and the interface may include a recording enabling control 401 and the like. The interface shown in a of FIG. 4 is similar to the interface shown in a of FIG. 3A, and details are not described herein again.

In the interface shown in a of FIG. 4, when the terminal device receives an operation of which the user triggers the recording enabling control 401, the terminal device may display an interface shown in b of FIG. 4, and the interface includes a recording sound quality option 402 and the like. The recording sound quality option 402 includes a high-definition sound quality option 403 and the like. The interface shown in b of FIG. 4 is similar to the interface shown in c of FIG. 3B, and details are not described herein again.

In the interface shown in b of FIG. 4, when the terminal device receives an operation of which the user triggers the high-definition sound quality option 403, the terminal device may perform recording according to the recording sound quality selected by the user.

It may be understood that, the recording sound quality option in the interface shown in c of FIG. 3B or the recording sound quality option in the interface shown in b of FIG. 4 may include other content according to an actual scene, for example, the terminal device may provide recording sound quality under 32 bit/48 khz or another parameter. This is not limited in this embodiment of this application.

Based on this, the terminal device can provide a user with a variety of recording sound quality options, so that the user can flexibly select an appropriate recording sound quality according to requirements.

Figure 5:
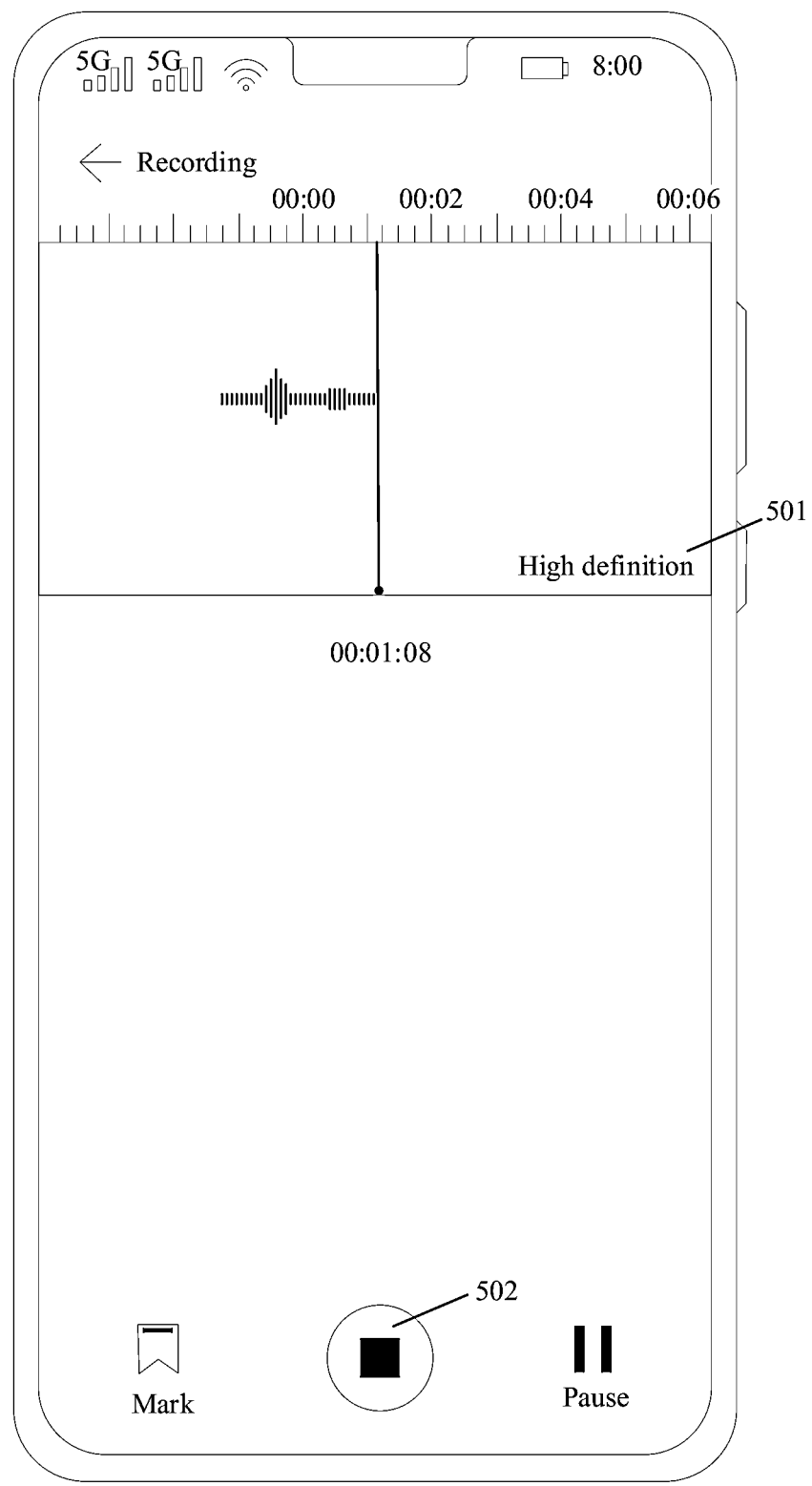
FIG. 5 is a schematic diagram of an interface of prompting recording sound quality according to an embodiment of this application.
Figure 6:
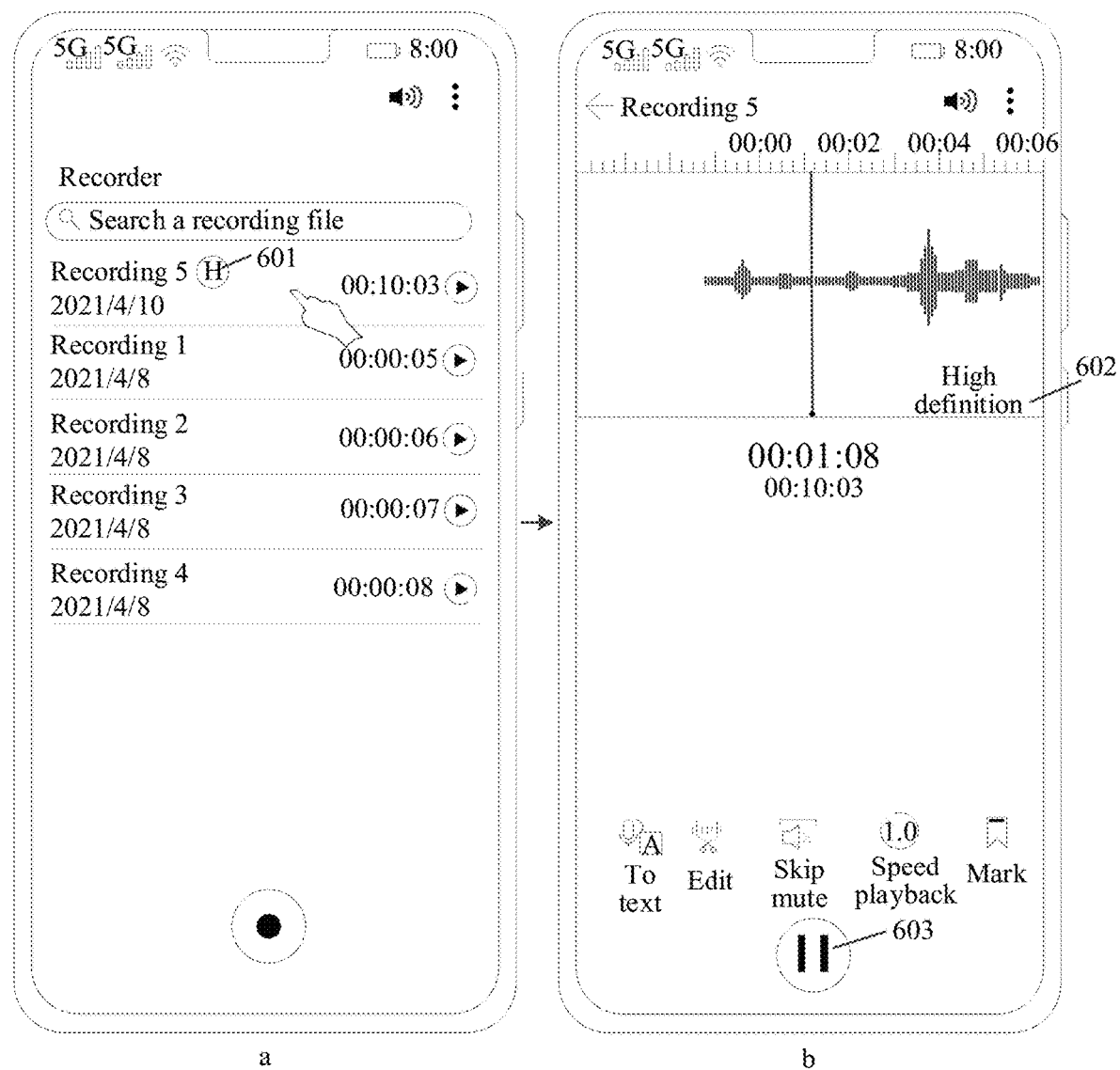
FIG. 6 is a schematic diagram of another interface of prompting recording sound quality according to an embodiment of this application.

Based on the embodiments corresponding to FIG. 3A, FIG. 3B, and FIG. 4, in a possible implementation, the terminal device may also display the recording sound quality selected by the user during sound recording (for example, an embodiment corresponding to FIG. 5) and during recording playback (for example, an embodiment corresponding to FIG. 6).

Exemplarily, FIG. 5 is a schematic diagram of an interface of prompting recording sound quality according to an embodiment of this application. In the embodiment corresponding to FIG. 5, exemplary descriptions are made by using an example in which the terminal device is a mobile phone, and this example does not constitute a limitation to the embodiments of this application.

When the terminal device starts recording based on the recording sound quality selected by the user, such as the high-definition sound quality, the terminal device may display an interface shown in FIG. 5. The interface may display waveform of a recorded sound and text information for prompting the recording sound quality such as high definition 501, a recording stop control 502, a mark control, a pause control, and the like. Optionally, when the user selects the standard sound quality, the interface shown in FIG. 5 may also display text information corresponding to the standard sound quality, such as standard.

Exemplarily, FIG. 6 is a schematic diagram of another interface of prompting recording sound quality according to an embodiment of this application. In the embodiment corresponding to FIG. 6, exemplary descriptions are made by using an example in which the terminal device is a mobile phone, and this example does not constitute a limitation to the embodiments of this application.

In the interface shown in FIG. 5, when the terminal device receives an operation of which the user triggers the recording stop control 502, the terminal device may display an interface shown in a of FIG. 6. Compared with the interface shown in a of FIG. 3A or the interface shown in b of FIG. 4, a recording file recorded in the embodiment corresponding to FIG. 5, such as a recording 5, is added to the interface shown in a of FIG. 6, and an identifier 601 corresponding to the high-definition sound quality is displayed around the recording 5.

In the interface shown in a of FIG. 6, when the terminal device receives an operation of which the user triggers a zone in which the recording 5 is located, the terminal device may display an interface as shown in b of FIG. 6, and the interface may display a speaker control, a control for enabling more functions, text information for prompting the recording sound quality such as high definition 602, a to-text control, an editing control, a mute skip control, a speed playback control, a mark control, a pause control 603, and the like. Optionally, when the user selects the standard sound quality, the interface shown in b of FIG. 6 may also display text information corresponding to the standard sound quality, such as standard.

Based on the embodiment corresponding to FIG. 3A and FIG. 3B or FIG. 4, in a possible implementation, the terminal device may perform sound recording processing with different degrees on a sound signal received by a MIC based on the recording sound quality selected by the user. Exemplarily, the terminal device may record based on a method for first-half-link high bit width+second-half-link bit width conversion (for example, an embodiment corresponding to FIG. 7 and an embodiment corresponding to FIG. 8). Alternatively, the terminal device may perform sound recording based on a method for a full-link uniform bit width (for example, an embodiment corresponding to FIG. 10 and an embodiment corresponding to FIG. 11).

Figure 7:
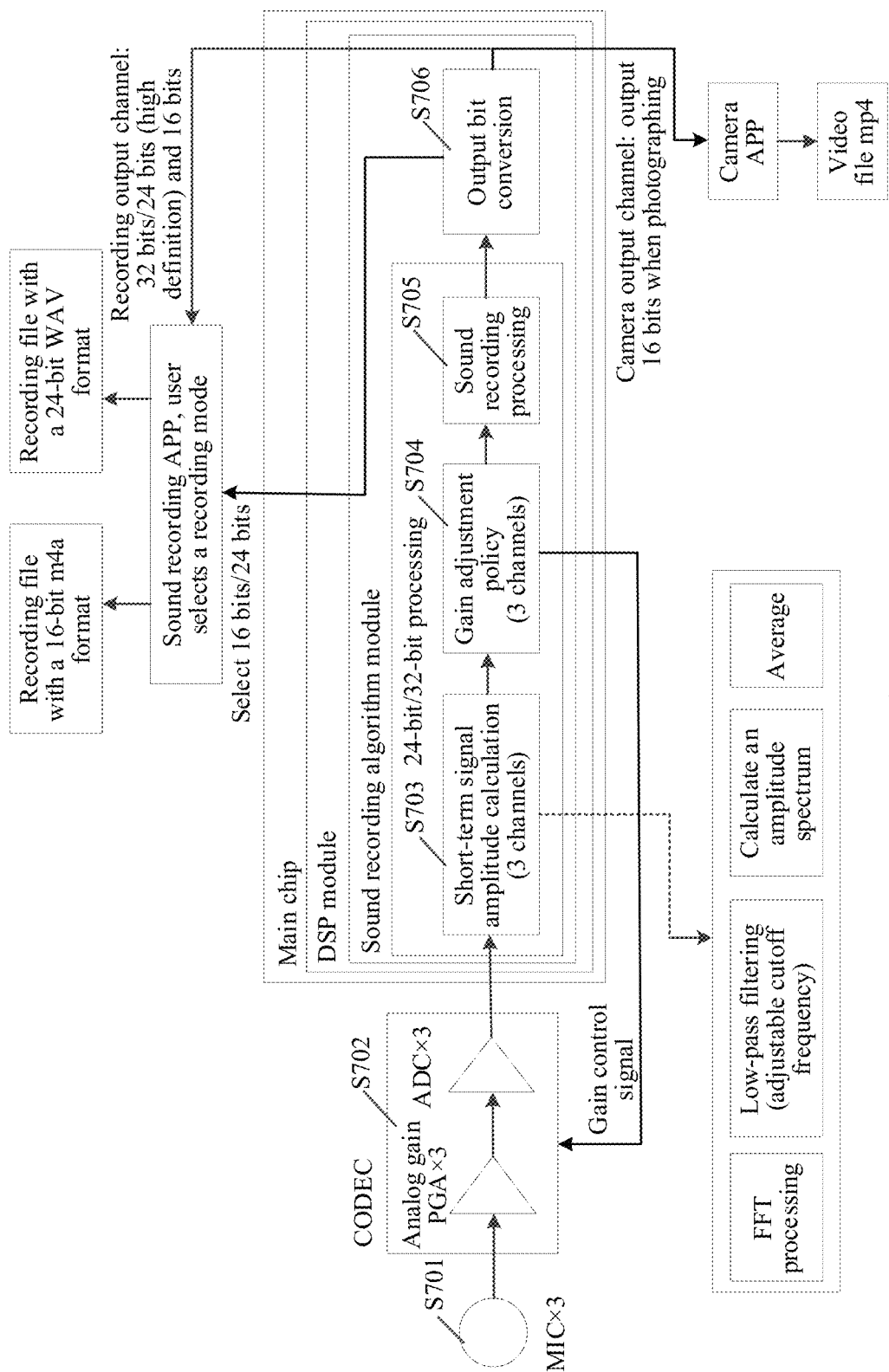
FIG. 7 is a schematic flowchart of a sound recording method for first-half-link high bit width+second-half-link bit width conversion according to an embodiment of this application.
Figure 8:
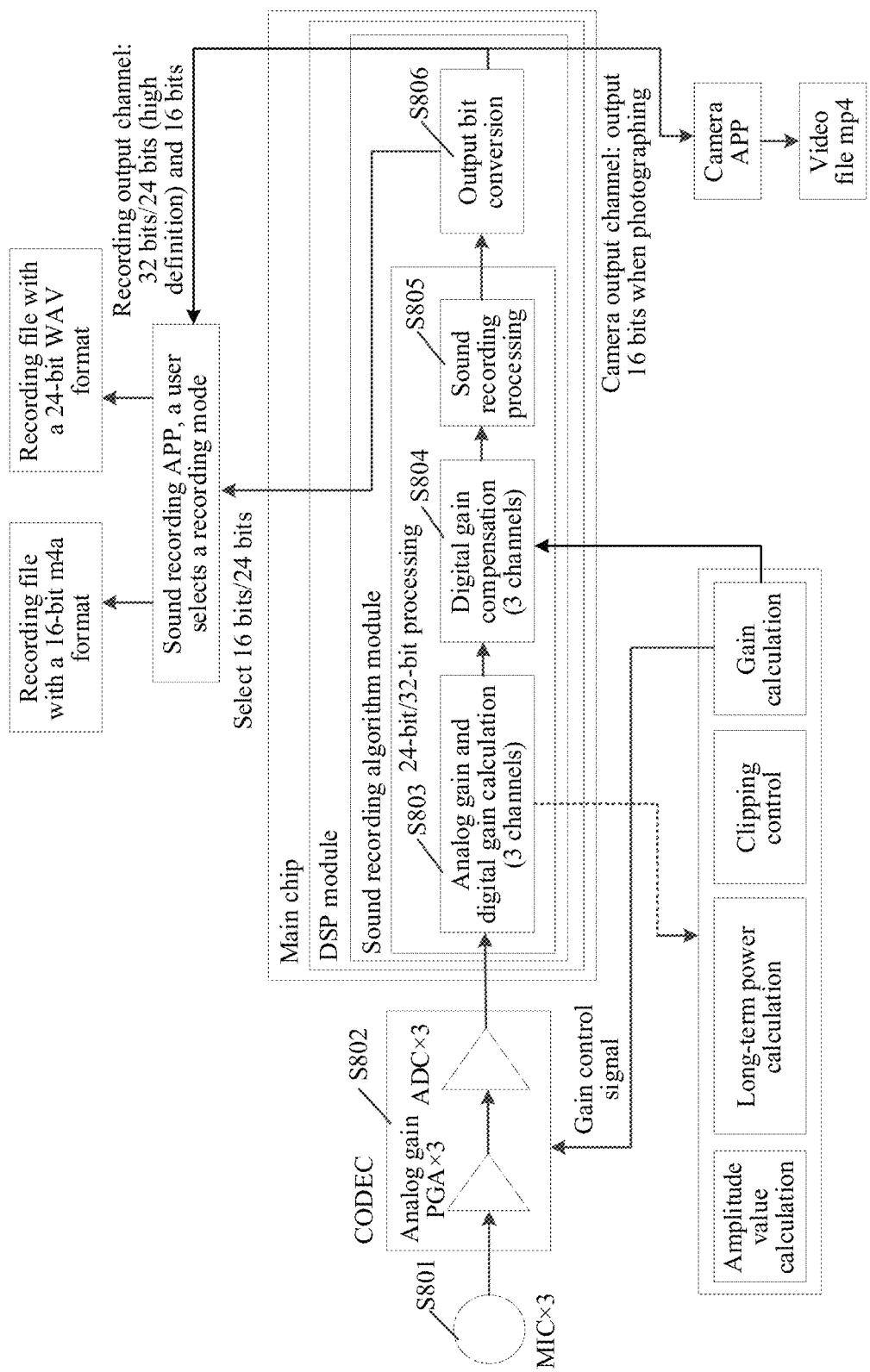
FIG. 8 is a schematic flowchart of another sound recording method for first-half-link high bit width+second-half-link bit width conversion according to an embodiment of this application.

In the embodiments corresponding to FIG. 7 and FIG. 8, a first half link may be understood as a link from a CODEC to sound recording processing, and a bit width of the first half link may be 24 bits/32 bits. A second half link may be understood as a link after sound recording processing, such as a link after outputting bit conversion and subsequence. A module corresponding to outputting bit conversion in the second half link may convert 24 bits/32 bits into 16 bits according to the recording sound quality set by the user, such as 16 bits. In the embodiments corresponding to FIG. 10 and FIG. 11, the full-link uniform bit width may be understood as that sound recording processing may be performed in a full link according to the recording sound quality set by the user, such as 16 bits/24 bits/32 bits In the sound recording method for first-half-link high bit width+second-half-link bit width conversion, a sound recording algorithm involved in the first half link may base on analog gain adjustment (for example, the embodiment corresponding to FIG. 7), or the sound recording algorithm may base on integrated analog gain and digital gain adjustment (for example, the embodiment corresponding to FIG. 8).

Exemplarily, FIG. 7 is a schematic flowchart of a sound recording method for first-half-link high bit width+second-half-link bit width conversion according to an embodiment of this application. In the embodiment corresponding to FIG. 7, exemplary descriptions are made by using an example in which a sound recording algorithm controls analog gain adjustment and there are three MICs on a terminal device. A sound recording algorithm module may include: short-term signal amplitude calculation, a gain adjustment policy, sound recording processing, and the like. A DSP module may include: the sound recording algorithm module, the bit conversion output module, and the like. A main chip may include the DSP module and the like.

As shown in FIG. 7, the sound recording method may include the following steps:

S701. The terminal device obtains a sound signal in an environment based on a microphone, and converts the sound signal into an analog signal.

S702. The CODEC in the terminal device processes the analog signal, and outputs a digital signal corresponding to the analog signal.

In this embodiment of this application, when there is one MIC, the CODEC may include one group of PGA+ADC; and when there are a plurality of MICs, each MIC may correspond to one group of PGA+ADC. As shown in FIG. 7, when there are three MICs, quantities of analog gain PGAs and ADCs may be three.

S703. The terminal device obtains a short-term signal amplitude of the digital signal processed by the CODEC.

In this embodiment of this application, the method for obtaining a short-term signal amplitude may perform fast fourier transform (fast fourier transform, FFT) processing on the digital signal in S702, to convert a time domain digital signal into a frequency domain signal; perform low-pass filtering processing on the frequency domain signal by using a cutoff frequency, where the cutoff frequency is adjustable; and calculate an amplitude spectrum of a low-pass filtered frequency domain signal, and average the amplitude spectrum according to a time length, for example, the time length may be 5 ms, 10 ms, or the like, to obtain the short-term signal amplitude. It may be understood that, because an environmental sound pressure level can change rapidly as the time changes and a longer measurement time indicates less measurement accuracy, the terminal device may identify the change of the environmental sound pressure level by using the short-term signal amplitude.

S704. The terminal device performs analog gain adjustment based on the short-term signal amplitude.

In this embodiment of this application, the terminal device may obtain an appropriate analog gain value according to a correspondence between the short-term signal amplitude and the analog gain indicated in an adjustment policy table. The adjustment policy table may be preset. For example, the price adjustment policy table may be obtained by the terminal device based on a historical record of analog gain adjustment, or may be generated by the terminal device based on training of sample data of the short-term signal amplitude and the analog gain. For example, the adjustment policy table may be shown in Table 1 below:

TABLE 1

Adjustment policy table

| Short-term signal amplitude (dBFS) | PGA (dB) |
|---|---|
| 0 | −12 |
| −6 | −6 |
| −12 | 0 |

It may be understood that, a correspondence between the short-term signal amplitude and the PGA indicated in the adjustment policy table may include other content according to an actual scene. This is not limited in this embodiment of this application.

Further, the terminal device may write an obtained analog gain of the PGA into a chip platform control register, and adjust analog gain of the MICs.

It may be understood that, when there are a plurality of MICs, each MIC may correspond to one channel formed from the CODEC to a gain adjustment policy. As shown in FIG. 7, when there are three MICs, three channels may be formed from the CODEC to the gain adjustment policy.

S705. The terminal device performs sound recording processing on the digital signal after analog gain adjustment.

In this embodiment of this application, when there are three MICs, the terminal device may combine and perform sound recording processing on signals outputted from the three channels.

S706. The terminal device performs output bit conversion and outputs a recording according to setting of the user on recording sound quality.

Exemplarily, in the second half link, in response to an operation of which the user sets the recording sound quality, the terminal device may issue a corresponding parameter in the output of bit conversion based on a bit width corresponding to the recording sound quality set by the user, so as to convert a 24-bit/32-bit signal in the first half link into a signal corresponding to the bit width set by the user, for example, convert the 24-bit/32-bit signal into a 24-bit/32-bit or 16-bit signal.

In this embodiment of this application, the terminal device may set two output channels for the sound recording algorithm, for example, a recording output channel and a camera output channel. The recording output channel may be designed for the sound recording APP, to support at least two bit width output modes, such as outputting a recording file with a 24-bit/32-bit (high-definition) WAV format, a recording file with a 16-bit (standard) m4a format, and the like. The above two 24-bit/32-bit (HD) and 16-bit (standard) recording output modes may be set by the user. The camera output channel may be designed for a recording module in a camera APP, to support at least one 16-bit bit width output mode, such as outputting a video file with a 16-bit mp4 format.

Exemplarily, the terminal device may issue different instructions corresponding to file types according to the outputted file types. For example, when the terminal device receives an instruction for outputting a video file, the terminal device may issue an instruction corresponding to a default 16-bit mp4 file to the sound recording algorithm module, so that the terminal device may convert 24-bit/32-bit data into 16-bit data by using the bit conversion output module in the step shown in S706. Alternatively, when the terminal device receives an instruction for outputting a recording file, the terminal device may further determine a sound recording processing manner according to a recording file format selected by the user. For example, when the terminal device receives an operation of which the user selects a recording with a 16-bit m4a format, the terminal device issues an instruction corresponding to the 16-bit m4a format to the sound recording algorithm module, and converts 24-bit/32-bit data into 16-bit data by using the bit conversion output module in the step shown in S706. Alternatively, when the terminal device receives an operation of which the user selects a recording with a 24-bit/32-bit WAV format, the terminal device issues an instruction corresponding to the 24-bit WAV format to the sound recording algorithm module, so that the terminal device may not perform bit conversion processing on recording data.

Based on this, the terminal device can reduce, based on analog gain adjustment, distortion caused by clipping in the MIC when an environmental sound pressure level is higher, and amplify the sound when the environmental sound pressure level is lower, to extend a dynamic range of the signal, thereby obtaining a better sound recording effect. Moreover, the terminal device can implement setting of the user on an outputted recording sound quality.

Exemplarily, FIG. 8 is a schematic flowchart of another sound recording method for first-half-link high bit width+ second-half-link bit width conversion according to an embodiment of this application. In the embodiment corresponding to FIG. 8, exemplary descriptions are made by using an example in which a sound recording algorithm controls analog gain adjustment and digital gain adjustment and there are three MICs on a terminal device. A sound recording algorithm module may include: short-term analog gain and digital gain calculation, digital gain compensation, sound recording processing, and the like. A DSP module may include: the sound recording algorithm module, the bit conversion output module, and the like. A main chip may include the DSP module and the like.

As shown in FIG. 8, the sound recording method may include the following steps:

S801. The terminal device obtains a sound signal in an environment based on a microphone, and converts the sound signal into an analog signal.

S802. The CODEC in the terminal device processes the analog signal, and outputs a digital signal corresponding to the analog signal.

S803. The terminal device calculates an analog gain and a digital gain of the digital signal processed by the CODEC.

In this embodiment of this application, the method for calculating an analog gain and a digital gain may be that, the terminal device counts a quantity of sampling points that exceed a first clipping threshold (or may also be understood as an amplitude threshold) and a second clipping threshold in one frame; and calculates long-term power of the current frame. A value of the one frame may be 10 ms. Exemplarily, long-term power of a signal f(t) at t may be:

$$Pl = \frac{\int_{-\infty}^{\infty} |f(t)|^2 dt}{t}$$

where, |f(t)| may be understood as an amplitude of the signal, a value of t may be 20 ms, 200 ms, or the like.

Further, the terminal device determines a type of the current signal. For example, the terminal device determines whether the current signal meets a first condition or a second condition. The first condition is that a quantity of clipped points of the current signal obtained by using the first clipping threshold is greater than a first count threshold. The second condition is that a quantity of clipped points of the current signal obtained by using the second clipping threshold is greater than a second count threshold and the long-term power of the signal is greater than a long-term power threshold. A signal that meets the first condition may be referred to as a short-term clipped large signal. A signal that meets the second condition may be referred to as a long-term clipped large signal, and a signal that does not meet the second condition may be referred to as a long-term clipped small signal. The above long-term power threshold may be the same as or different from the following first long-term power threshold (or second long-term power threshold). This is not limited in this embodiment of this application.

It may be understood that, when a duration for which long-term power of a signal is greater than the first long-term power threshold reaches a corresponding time limit, or a duration for which the long-term power of the signal is greater than the second long-term power threshold reaches the corresponding time limit, the signal may be understood as a large signal. Alternatively, when a duration for which the long-term power of the signal is less than a third long-term power threshold reaches a corresponding time limit, or a duration for which the long-term power of the signal is less than a fourth long-term power threshold reaches the corresponding time limit, the signal may be understood as a small signal. When a signal timer of the terminal device detects that a duration for which the quantity of clipped points of the current signal does not exceed the above first count threshold or second count threshold exceeds the time limit, it indicates that the current signal is relatively stable, and the terminal device may adaptively increase the time limit when measuring that the long-term power of the large signal is greater than the first long-term power threshold (or the second long-term power threshold), and adaptively increase the time limit when measuring that the long-term power of the small signal is less than the third long-term power threshold (or the fourth long-term power threshold).

Further, the terminal device may calculate the analog gain of the signal based on the clipping of the signal. Exemplarily, the terminal device stores a correspondence between a signal type and an analog gain, and determines a value of the analog gain according to the signal type. For example, the signal type may include a short-term clipped large signal, a long-term large signal, a long-term small signal, or the like. For the short-term clipped large signal, to reduce the clipping time, the terminal device may fast reduce the analog gain, for example, the analog gain may be reduced by 12 dB per second or the like. For the long-term large signal, the signal is not clipped, a clipping probability is increased, and the terminal device may slowly reduce the analog gain, for example, the analog gain may be reduced by 3 dB per second or the like. For the long-term small signal, the terminal device may slowly increase the analog gain, for example, the analog gain may be reduced by 3 dB per second or the like. In this way, the terminal device may write a calculation result of the analog gain into a chip platform control register, and adjust analog gains of the MICs.

A specific value of the above analog gain adjustment may be preset, for example, the value of analog gain adjustment may be obtained based on experience of which developers perform analog gain adjustment for many times. Exemplarily, the analog gain value may be adjusted according to the signal type. It may be understood that, the specific value of the above analog gain adjustment may include other content according to an actual scene. This is not limited in this embodiment of this application.

Further, the terminal device calculates a digital gain of a signal based on a difference between an analog gain of the signal and an initial analog gain of the signal. For example, when the analog gain of the signal is greater than (or much greater than) the initial analog gain of the signal, the terminal device may slowly (or fast) reduce the digital gain. Alternatively, when the analog gain of the signal is less than (or much less than) the initial analog gain of the signal, the terminal device may slowly (or fast) increase the digital gain.

S804. The terminal device performs digital gain compensation based on the digital gain.

In this embodiment of this application, the terminal device may perform digital gain compensation by using a dynamic range control (dynamic range control, DRC) method. For example, the terminal device may configure, according to a difference between the analog gain of the signal and the initial analog gain of the signal, a DRC curve corresponding to the difference, to implement digital gain compensation. Alternatively, the terminal device may also perform digital gain compensation by using another method. This is not limited in this embodiment of this application.

It may be understood that, the digital gain compensation is used for resolving the problem that an introduced speech fluctuates due to dynamic adjustment of the analog gain. For example, when the analog gain of the signal is reduced, a sound corresponding to the signal suddenly decreases. Therefore, the terminal device may slow down the sudden decrease in sound through digital gain compensation.

Figure 9:
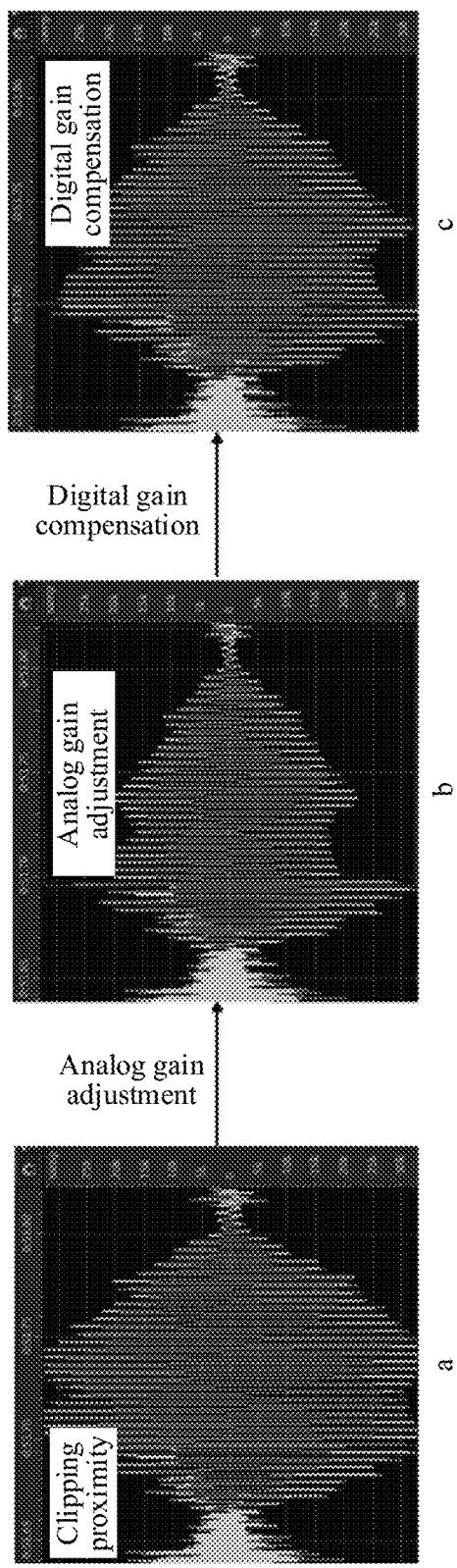
FIG. 9 is a schematic diagram of a signal of gain adjustment according to an embodiment of this application.

Exemplarily, FIG. 9 is a schematic diagram of a signal of gain adjustment according to an embodiment of this application. A signal shown in a of FIG. 9 may be clipped. The signal after analog gain adjustment in the step shown in S803 may be shown in b of FIG. 9. The signal after digital gain compensation in the step shown in S804 may be shown in c of FIG. 9.

S805. The terminal device performs sound recording processing on the digital signal after analog gain and digital gain adjustment.

S806. The terminal device performs output bit conversion and outputs a recording according to setting of the user on recording sound quality.

In the second half link, the method for outputting bit conversion in the step shown in S806 is similar to the method for outputting bit conversion in the step shown in S706, and output modes of a recording or video in the step shown in S806 are similar to the output modes of the recording or video in the step shown in S706. Details are not described herein again.

Based on this, the terminal device can reduce, based on integrated analog gain and digital gain adjustment, distortion caused by clipping in the MIC when an environmental sound pressure level is higher, and amplify the sound when the environmental sound pressure level is lower, to extend a dynamic range of the signal, thereby obtaining a better sound recording effect. Moreover, the terminal device can implement setting of the user on an outputted recording sound quality.

Figure 10:
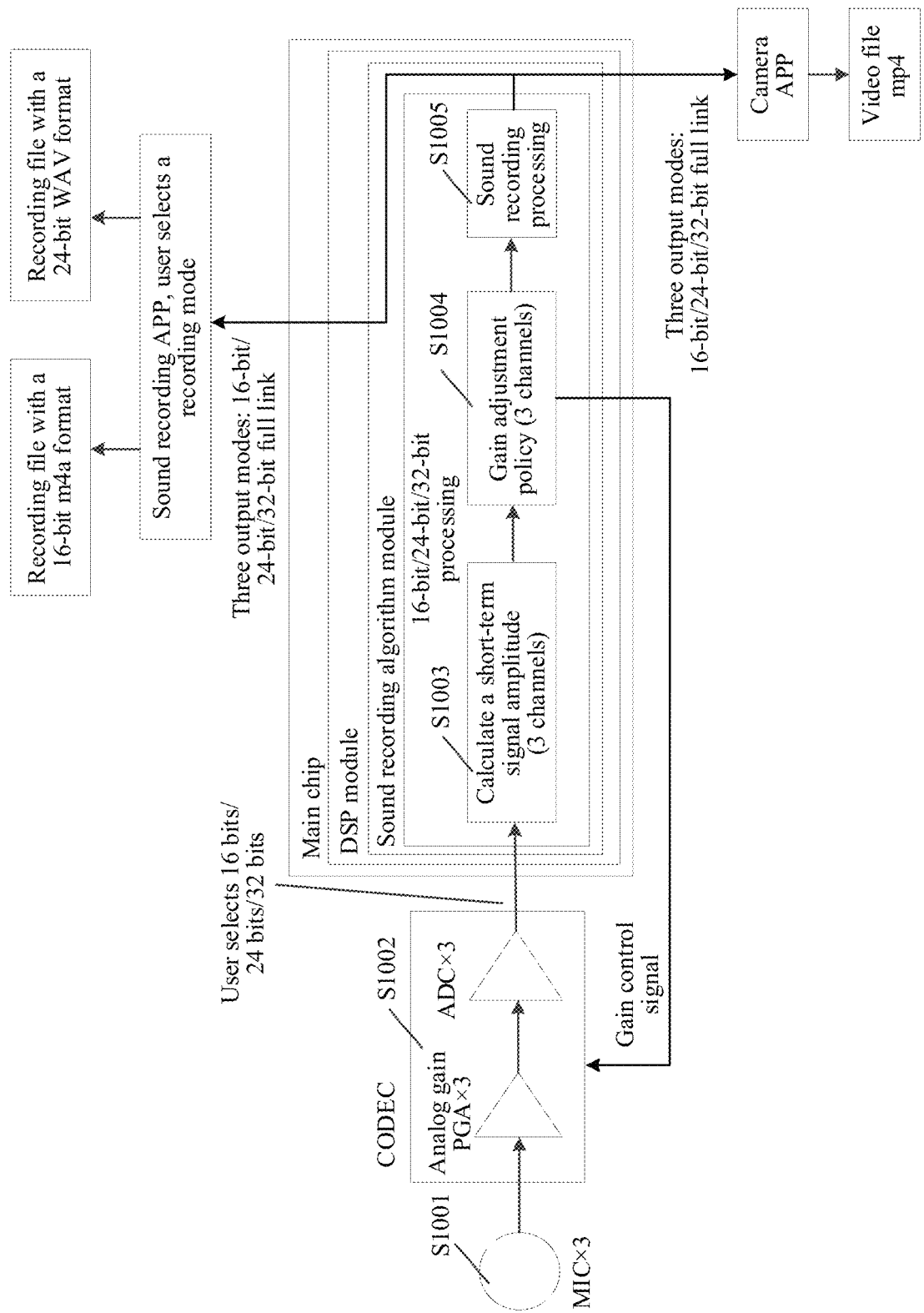
FIG. 10 is a schematic flowchart of a sound recording method for a full-link uniform bit width according to an embodiment of this application.
Figure 11:
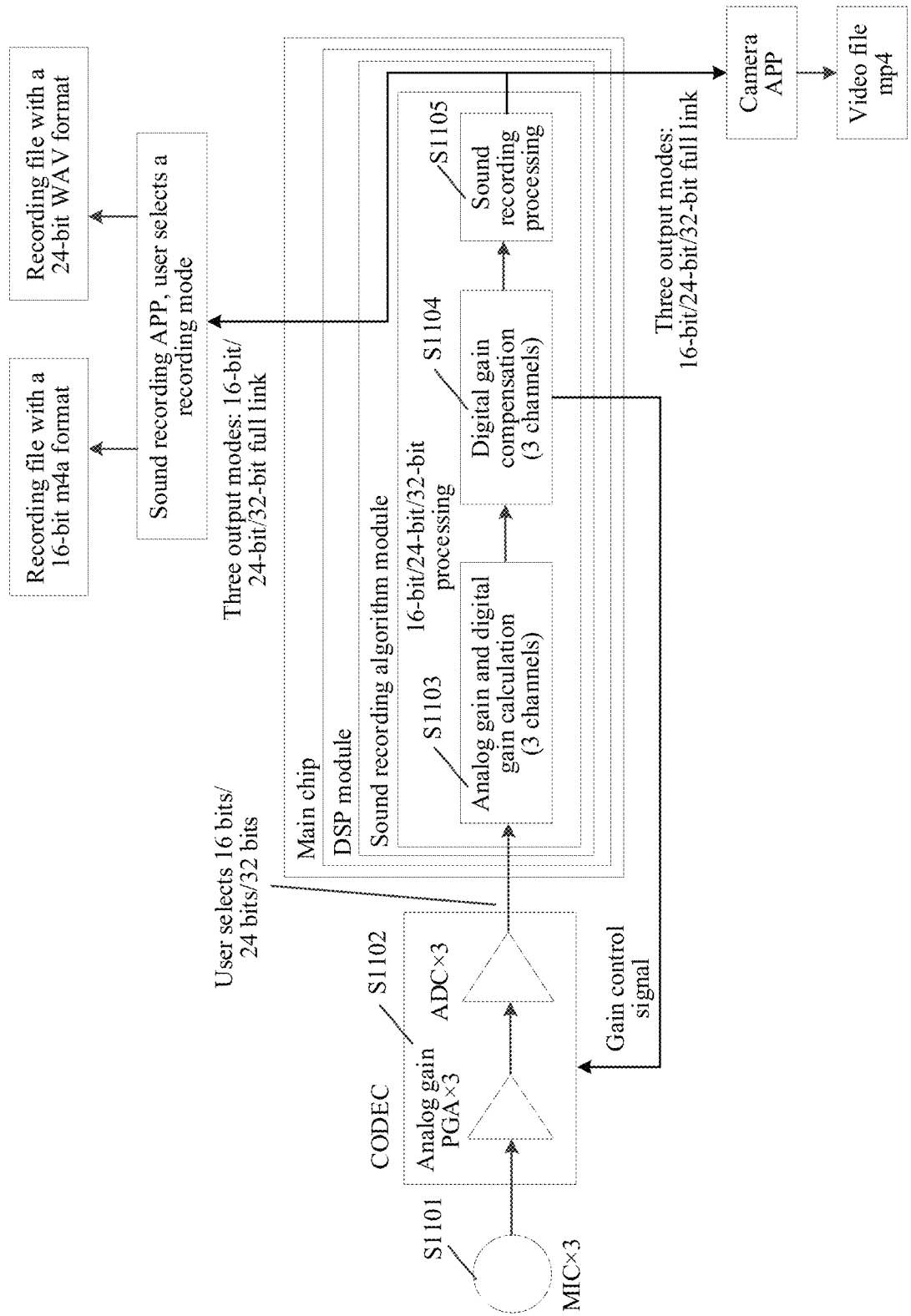
FIG. 11 is a schematic flowchart of another sound recording method for a full-link uniform bit width according to an embodiment of this application.

In the sound recording method based on a full-link uniform bit width, a sound recording algorithm may base on analog gain adjustment (for example, the embodiment corresponding to FIG. 10), or the sound recording algorithm may also base on integrated analog gain and digital gain adjustment (for example, the embodiment corresponding to FIG. 11).

It may be understood that, in the sound recording method for full-link uniform bit width, if the terminal device can implement sound recording of 16 bits, 24 bits and 32 bits and other bit widths, the sound recording algorithm of the link may include algorithm modules respectively corresponding to 16 bits, 24 bits, and 32 bits, so that the terminal device may invoke an instruction to execute a corresponding algorithm module based on a selection of the user on the recording sound quality.

Exemplarily, FIG. 10 is a schematic flowchart of a sound recording method for a full-link uniform bit width according to an embodiment of this application. In the embodiment corresponding to FIG. 10, exemplary descriptions are made by using an example in which a sound recording algorithm controls analog gain adjustment and there are three MICs on a terminal device. A sound recording algorithm module may include: short-term signal amplitude calculation, a gain adjustment policy, sound recording processing, and the like. A DSP module may include the sound recording algorithm and the like. A main chip may include the DSP module and the like.

As shown in FIG. 10, the sound recording method may include the following steps:

S1001. The terminal device obtains a sound signal in an environment based on a microphone, and converts the sound signal into an analog signal.

S1002. The CODEC in the terminal device processes the analog signal based on setting of the user on recording sound quality, and outputs a digital signal corresponding to the analog signal.

The terminal device may perform sound recording processing based on the recording sound quality set by the user in the embodiment corresponding to FIG. 3A and FIG. 3B or the embodiment corresponding to FIG. 4, for example, 16 bits/24 bits/32 bits.

Exemplarily, the terminal device may issue instructions corresponding to file types according to the outputted file types. For example, when the terminal device receives an instruction for outputting a video file, the terminal device may issue an instruction corresponding to a default 16-bit mp4 file to the CODEC and the sound recording algorithm module, so that the terminal device may set a parameter of a bit width of the ADC in the CODEC and a parameter of a bit width in the sound recording algorithm module according to the 16-bit instruction. Alternatively, when the terminal device receives an instruction for outputting a recording file, the terminal device may further determine a sound recording processing manner according to a recording file format selected by the user. For example, when the terminal device receives an operation of which the user selects a recording with a 16-bit m4a format, the terminal device issues an instruction corresponding to the 16-bit m4a format to the CODEC and the sound recording algorithm module, and may set a parameter of a bit width of the ADC in the CODEC and a parameter of a bit width in the sound recording algorithm module according to the 16-bit instruction. Alternatively, when the terminal device receives an operation of which the user selects a recording with a 24-bit/32-bit WAV format, the terminal device issues an instruction corresponding to the 24-bit/32-bit WAV format to the CODEC and the sound recording algorithm module, and may set a parameter of a bit width of the ADC in the CODEC and a parameter of a bit width in the sound recording algorithm module according to the 24-bit instruction, thereby avoiding the process of bit conversion, and realizing the full-link uniform bit width.

S1003. The terminal device obtains a short-term signal amplitude of the digital signal processed by the CODEC.

In this embodiment of this application, the method for obtaining a short-term signal amplitude in the step shown in S1003 is similar to the method for obtaining a short-term signal amplitude in the step shown in S703. Details are not described herein again.

S1004. The terminal device performs analog gain adjustment based on the short-term signal amplitude.

In this embodiment of this application, the method for performing analog gain adjustment in the step shown in S1004 is similar to the method for performing analog gain adjustment in the step shown in S704. Details are not described herein again.

S1005. The terminal device performs sound recording processing on the digital signal after analog gain adjustment, and outputs a recording.

In this embodiment of this application, both the sound recording APP and the camera APP may implement the 16-bit/24-bit/32-bit output modes of the full link, and a recording format corresponding to each output mode is similar to a recording output format in the embodiment corresponding to FIG. 7. Details are not described herein again.

It may be understood that, because the sound recording processing method for a full-link uniform bit width is used in the embodiment corresponding to FIG. 10, compared with the embodiment corresponding to FIG. 7, the sound recording processing logic may be simplified, and occupation of the bit conversion output module on the memory space may be reduced.

Based on this, the terminal device can reduce, based on analog gain adjustment, distortion caused by clipping in the MIC when an environmental sound pressure level is higher, and amplify the sound when the environmental sound pressure level is lower, to extend a dynamic range of the signal, thereby obtaining a better sound recording effect. Moreover, the terminal device can implement setting of the user on an outputted recording sound quality.

Exemplarily, FIG. 11 is a schematic flowchart of another sound recording method for a full-link uniform bit width according to an embodiment of this application. In the embodiment corresponding to FIG. 11, exemplary descriptions are made by using an example in which a sound recording algorithm controls integrated analog gain and digital gain adjustment and there are three MICs on a terminal device. A sound recording algorithm module may include: short-term analog gain and digital gain calculation, digital gain compensation, sound recording processing, and the like. A DSP module may include the sound recording algorithm and the like. A main chip may include the DSP module and the like.

As shown in FIG. 11, the sound recording method may include the following steps:

S1101. The terminal device obtains a sound signal in an environment based on a microphone, and converts the sound signal into an analog signal.

S1102. The CODEC in the terminal device processes the analog signal based on setting of the user on recording sound quality and outputs a digital signal corresponding to the analog signal.

S1103. The terminal device calculates an analog gain and a digital gain of the digital signal processed by the CODEC.

In this embodiment of this application, the method for calculating an analog gain and a digital gain in the step shown in S1103 is similar to the method for calculating an analog gain and a digital gain in the step shown in S803. Details are not described herein again.

S1104. The terminal device performs digital gain compensation based on the digital gain.

In this embodiment of this application, the method for performing digital gain compensation in the step shown in S1104 is similar to the method for performing digital gain compensation in the step shown in S804. Details are not described herein again.

S1105. The terminal device performs sound recording processing on the digital signal after analog gain adjustment, and outputs a recording.

In this embodiment of this application, the method for performing sound recording processing in the step shown in S1105 is similar to the method for performing sound recording processing in the step shown in S805, and output modes of a recording or video in the step shown in S1105 are similar to the output modes of the recording or video in the step shown in S1005. Details are not described herein again.

It may be understood that, because the sound recording processing method for a full-link uniform bit width is used in the embodiment corresponding to FIG. 11, compared with the embodiment corresponding to FIG. 8, the sound recording processing logic may be simplified, and occupation of the bit conversion output module on the memory space may be reduced.

Based on this, the terminal device can reduce, based on integrated analog gain and digital gain adjustment, distortion caused by clipping in the MIC when an environmental sound pressure level is higher, and amplify the sound when the environmental sound pressure level is lower, to extend a dynamic range of the signal, thereby obtaining a better sound recording effect. Moreover, the terminal device can implement setting of the user on an outputted recording sound quality.

It may be understood that, the interface described in this embodiment of this application is merely an example. This is not limited in this embodiment of this application.

It may be understood that, the interface described in this embodiment of this application is merely an example. This is not further limited in this embodiment of this application.

Figure 12:
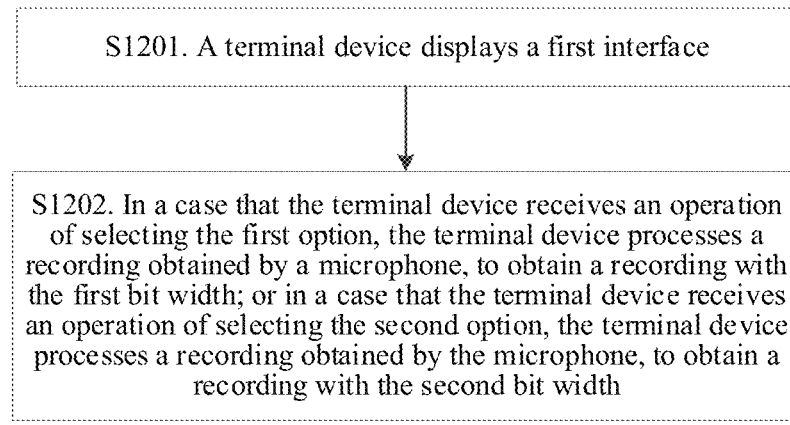
FIG. 12 is a schematic flowchart of a sound recording method according to an embodiment of this application.

Based on the content described in the above embodiments, to better understand the various embodiments of this application, exemplarily, FIG. 12 is a schematic flowchart of a sound recording method according to an embodiment of this application.

As shown in FIG. 12, the sound recording method may include the following steps:

S1201. A terminal device displays a first interface.

In this embodiment of this application, the first interface may be the interface shown in c of FIG. 3B. A first control may be the recording sound quality option 308 shown in c of FIG. 3B, and the first control includes: a first option used for selecting a recording whose output specification is sound quality with a first bit width, where the first option may be the option corresponding to the standard sound quality shown in c of FIG. 3B; and a second option used for selecting a recording whose output specification is sound quality of a second bit width, where the second option may be the high-definition sound quality option 309 shown in c of FIG. 3B.

S1202. In a case that the terminal device receives an operation of selecting the first option, the terminal device processes a recording obtained by a microphone, to obtain a recording with the first bit width; or in a case that the terminal device receives an operation of selecting the second option, the terminal device processes a recording obtained by a microphone, to obtain a recording with the second bit width.

In this embodiment of this application, in the interface shown in c of FIG. 3B, a first operation may be an operation of triggering the option corresponding to the standard sound quality or triggering the high-definition sound quality option 309 in the recording sound quality option 308.

Optionally, the method further includes: displaying, by the terminal device, a second interface, where the second interface includes a second control; receiving, by the terminal device, a first operation for the second control; displaying, by the terminal device, a third interface in response to the first operation, where the third interface includes a third control; receiving, by the terminal device, a second operation for the third control; and the displaying, by the terminal device, a first interface includes: displaying, by the terminal device, the first interface in response to the second operation.

In this embodiment of this application, the second interface may be the interface shown in a of FIG. 3A, and the second control may be the more control 301 for enabling more functions in the interface shown in a of FIG. 3A. The first operation may be an operation of triggering the more control 301 for enabling more functions. The third interface may be the interface shown in b of FIG. 3A, the third control may be the recording sound quality control 305 in the interface shown in b of FIG. 3A, and the second operation may be an operation of triggering the recording sound quality control 305.

Optionally, the second interface further includes a fourth control, and S1202 includes: receiving, by the terminal device, a third operation for the fourth control; and processing, by the terminal device in response to the third operation, the recording obtained by the microphone, to obtain the recording with the first bit width.

In this embodiment of this application, the fourth control may be the recording enabling control 302 shown in a of FIG. 3A, and the third operation may be an operation of triggering the recording enabling control 302.

Optionally, the third interface further includes: a fifth control configured to implement a speech-to-text service, a sixth control configured to implement sorting of recording files, and a seventh control configured to view information about a sound recording application that are displayed in the form of a list.

In this embodiment of this application, in the interface shown in b of FIG. 3A, the fifth control configured to implement the speech-to-text service may be the to-text service control 304, the sixth control configured to implement the sorting of recording files may be the sorting control 306, and the seventh control configured to view the information of the sound recording application may be the about control 307.

Optionally, the second interface further includes a recording file, a first identifier corresponding to the recording file is displayed around the recording file, and the first identifier is used for identifying a sound quality type of the recording file.

In this embodiment of this application, the second interface may also be the interface shown in a of FIG. 6, and the first identifier may be the identifier 601 corresponding to the recording 5.

Optionally, the method further includes: receiving, by the terminal device, a fourth operation for the recording file; and displaying, by the terminal device, a fourth interface in response to the fourth operation, where the fourth interface includes a recording playback identifier and a second identifier, the second identifier is used for identifying an audio type of the recording file, and the second identifier and the first identifier are different.

In this embodiment of this application, the fourth operation may be an operation of triggering the recording 5 in the interface shown in a of FIG. 6. The fourth interface may be the interface shown in b of FIG. 6, and the second identifier may be the high definition identifier 602 shown in b of FIG. 6.

Optionally, the method further includes: displaying, by the terminal device, a fifth interface, where the fifth interface includes an eighth control; receiving, by the terminal device, a fifth operation for the eighth control; and the displaying, by the terminal device, a first interface includes: displaying, by the terminal device, the first interface in response to the fifth operation.

In this embodiment of this application, the fifth interface may be the interface shown in a of FIG. 4, and the eighth control may be the recording enabling control 401 in the interface shown in a of FIG. 4. The fifth operation may be an operation of triggering the more recording enabling control 401.

Optionally, the terminal device further includes a codec CODEC, and S1202 of processing, by the terminal device, a recording obtained by a microphone, to obtain a recording with the first bit width includes: processing, by the terminal device based on the second bit width, the recording obtained by the microphone, to obtain a processed first signal, where the second bit width is a bit width defaulted by the terminal device; and converting, by the terminal device, the first signal into a signal corresponding to the first bit width, to obtain the recording with the first bit width; or converting, by the terminal device based on the second bit width, the recording obtained by the microphone into a signal corresponding to the first bit width in the CODEC; and processing, by the terminal device, the signal corresponding to the first bit width, to obtain the recording with the first bit width.

Optionally, the processing, by the terminal device based on the second bit width, the recording obtained by the microphone, to obtain a processed first signal includes: inputting, by the terminal device based on the second bit width, the recording obtained by the microphone into the CODEC, to obtain a digital signal corresponding to the recording obtained by the microphone; calculating, by the terminal device, first amplitude information of the digital signal; obtaining, by the terminal device according to a correspondence between the first amplitude information and first analog gain information, the first analog gain information corresponding to the first amplitude information; and performing, by the terminal device based on the first analog gain information, analog gain adjustment on the digital signal, to obtain the processed first signal.

In this embodiment of this application, the first amplitude information may be a short-term signal amplitude, and the first analog gain information may be an analog gain corresponding to the short-term signal amplitude. A correspondence between the first amplitude information the first analog gain information may be obtained from an adjustment policy table.

Optionally, the calculating, by the terminal device, first amplitude information of the digital signal includes: converting, by the terminal device using fast Fourier transformation FFT, the digital signal into a frequency domain signal; filtering, by the terminal device, the frequency domain signal, to obtain a filtered signal; calculating, by the terminal device, an amplitude spectrum corresponding to the filtered signal; and calculating, by the terminal device based on a first time length, the first amplitude information of the digital signal.

Optionally, the processing, by the terminal device based on the second bit width, the recording obtained by the microphone, to obtain a processed first signal includes: inputting, by the terminal device based on the second bit width, the recording obtained by the microphone into the CODEC, to obtain a digital signal corresponding to the recording obtained by the microphone; determining, by the terminal device, a type of the digital signal based on long-term power of the digital signal and a quantity of sampling points in the digital signal that exceed a first amplitude threshold or a second amplitude threshold; determining, by the terminal device according to a correspondence between the type of the digital signal and second analog gain information, the second analog gain information corresponding to the type of the digital signal; processing, by the terminal device based on the second analog gain information, the recording obtained by the microphone, to obtain a digital signal after analog gain processing; determining, by the terminal device, digital gain information corresponding to the digital signal according to a difference between the second analog gain information and initial analog gain information of the digital signal; and performing, by the terminal device based on the digital gain information, the digital signal after analog gain processing, to obtain the processed first signal.

Optionally, the type of the digital signal includes a first type of digital signal, a second type of digital signal, and a third type of digital signal; the first type of digital signal is a signal that meets a first condition; the second type of digital signal is a signal that meets a second condition; the third type of digital signal is a signal that does not meet the second condition; the first condition is that a quantity of sampling points greater than the first amplitude threshold in the digital signal is greater than a first count threshold; and the second condition is that a quantity of sampling points greater than the second amplitude threshold in the digital signal is greater than a second count threshold, and the long-term power of the digital signal is greater than first long-term power threshold.

In this embodiment of this application, the first type of digital signal may be a short-term clipped large signal, the second type of digital signal may be a long-term large signal, and the third type of digital signal may be a long-term small signal, The first amplitude threshold may be referred to as a first clipping threshold, and the second amplitude threshold may be referred to as a second clipping threshold.

Optionally, the first bit width is 16 bits, and the second bit width is 24 bits or 32 bits.

Optionally, the terminal device includes a sound recording algorithm module and a CODEC, and the processing, by the terminal device in a case that the terminal device receives an operation of selecting the first option, a recording obtained by a microphone, to obtain a recording with the first bit width includes: issuing, by the terminal device in a case that the terminal device receives the operation of selecting the first option, a first instruction to the sound recording algorithm module and/or the CODEC based on a format of a recording file and the operation of selecting the first option; and processing, by the sound recording algorithm module and/or the CODEC of the terminal device based on the first instruction, the recording obtained by the microphone, to obtain the recording with the first bit width.

Figure 13:
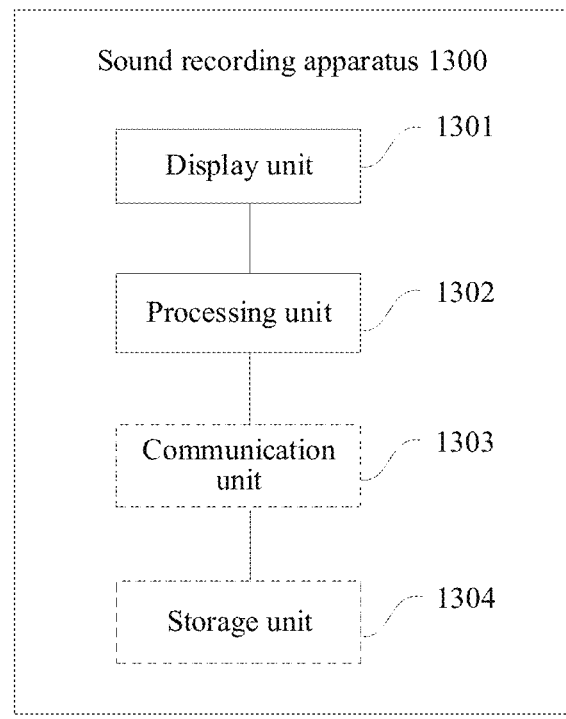
FIG. 13 is a schematic structural diagram of a sound recording apparatus according to an embodiment of this application.

The method provided in the embodiments of this application is described above with reference to FIG. 3A to FIG. 12, and an apparatus for performing the above method provided in the embodiments of this application is described below. FIG. 13 is a schematic structural diagram of a sound recording apparatus according to an embodiment of this application. The sound recording apparatus may be a terminal device in this embodiment of this application, or may be a chip or a chip system in the terminal device.

As shown in FIG. 13, a sound recording apparatus 1300 may be applied to a communication device, a circuit, a hardware component, or a chip, and the sound recording apparatus includes: a display unit 1301 and a processing unit 1302. The display unit 1301 is configured to support the display steps performed by the sound recording method. The processing unit 1302 is configured to support the information processing steps performed by the sound recording apparatus.

Specifically, an embodiment of this application provides a sound recording apparatus 1300, a terminal device includes a microphone, and the apparatus includes: a display unit 1301, configured to display a first interface, where the first interface includes a first control, and the first control includes: a first option used for selecting a recording whose output specification is sound quality with a first bit width, and a second option used for selecting a recording whose output specification is sound quality of a second bit width; and a processing unit 1302, configured to process, in a case that the terminal device receives an operation of selecting the first option, a recording obtained by the microphone, to obtain a recording with the first bit width; or the processing unit 1302, further configured to process, in a case that the terminal device receives an operation of selecting the second option, a recording obtained by the microphone, to obtain a recording with the second bit width.

In a possible implementation, the display unit 1301 is further configured to display a second interface, where the second interface includes a second control; the processing unit 1302 is further configured to receive a first operation for the second control; the display unit 1301 is further configured to display a third interface in response to the first operation, where the third interface includes a third control; the processing unit 1302 is further configured to receive a second operation for the third control; and the display unit 1301 is further configured to display the first interface in response to the second operation.

In a possible implementation, the second interface further includes a fourth control, and the processing unit 1302 is specifically configured to receive a third operation for the fourth control; and the processing unit 1302 is further specifically configured to process the recording obtained by the microphone in response to the third operation, to obtain the recording with the first bit width.

In a possible implementation, the third interface further includes: a fifth control configured to implement a speech-to-text service, a sixth control configured to implement sorting of recording files, and a seventh control configured to view information about a sound recording application that are displayed in the form of a list.

In a possible implementation, the second interface further includes a recording file, a first identifier corresponding to the recording file is displayed around the recording file, and the first identifier is used for identifying a sound quality type of the recording file.

In a possible implementation, the processing unit 1302 is further configured to receive a fourth operation for the recording file; and the display unit 1301 is further configured to display a fourth interface in response to the fourth operation, where the fourth interface includes a recording playback identifier and a second identifier, the second identifier is used for identifying an audio type of the recording file, and the second identifier and the first identifier are different.

In a possible implementation, the display unit 1301 is further configured to display a fifth interface, where the fifth interface includes an eighth control; the processing unit 1302 is further configured to receive a fifth operation for the eighth control; and the display unit 1301 is further configured to display the first interface in response to the fifth operation.

In a possible implementation, the terminal device further includes a codec CODEC, and the processing unit 1302 is specifically configured to: process, based on the second bit width, the recording obtained by the microphone, to obtain a processed first signal, where the second bit width is a bit width defaulted by the terminal device; and convert the first signal into a signal corresponding to the first bit width, to obtain the recording with the first bit width; or convert, based on the second bit width, the recording obtained by the microphone into a signal corresponding to the first bit width in the CODEC; and process the signal corresponding to the first bit width, to obtain the recording with the first bit width.

In a possible implementation, the processing unit 1302 is specifically configured to: input, based on the second bit width, the recording obtained by the microphone into the CODEC, to obtain a digital signal corresponding to the recording obtained by the microphone; calculate first amplitude information of the digital signal; obtain, according to a correspondence between the first amplitude information and first analog gain information, the first analog gain information corresponding to the first amplitude information; and perform, based on the first analog gain information, analog gain adjustment on the digital signal, to obtain the processed first signal.

In a possible implementation, the processing unit 1302 is specifically configured to: convert, by using fast Fourier transformation FFT, the digital signal into a frequency domain signal; filter the frequency domain signal, to obtain a filtered signal; calculate an amplitude spectrum corresponding to the filtered signal; and calculate, based on a first time length, the first amplitude information of the digital signal.

In a possible implementation, the processing unit 1302 is specifically configured to: input, based on the second bit width, the recording obtained by the microphone into the CODEC, to obtain a digital signal corresponding to the recording obtained by the microphone; determine a type of the digital signal based on long-term power of the digital signal and a quantity of sampling points in the digital signal that exceed a first amplitude threshold or a second amplitude threshold; determine, according to a correspondence between the type of the digital signal and second analog gain information, the second analog gain information corresponding to the type of the digital signal; process, based on the second analog gain information, the recording obtained by the microphone, to obtain a digital signal after analog gain processing; determine digital gain information corresponding to the digital signal according to a difference between the second analog gain information and initial analog gain information of the digital signal; and perform, based on the digital gain information, the digital signal after analog gain processing, to obtain the processed first signal.

In a possible implementation, the type of the digital signal includes a first type of digital signal, a second type of digital signal, and a third type of digital signal; the first type of digital signal is a signal that meets a first condition; the second type of digital signal is a signal that meets a second condition; the third type of digital signal is a signal that does not meet the second condition; the first condition is that a quantity of sampling points greater than the first amplitude threshold in the digital signal is greater than a first count threshold; and the second condition is that a quantity of sampling points greater than the second amplitude threshold in the digital signal is greater than a second count threshold, and the long-term power of the digital signal is greater than first long-term power threshold.

In a possible implementation, the first bit width is 16 bits, and the second bit width is 24 bits or 32 bits.

In a possible implementation, the terminal device includes a sound recording algorithm module and a CODEC, and the processing unit 1302 is specifically configured to: issue, by the terminal device, in a case that the terminal device receives the operation of selecting the first option, a first instruction to the sound recording algorithm module and/or the CODEC based on a format of a recording file and the operation of selecting the first option; and process, based on the first instruction, the recording obtained by the microphone, to obtain the recording with the first bit width.

In a possible embodiment, the sound recording apparatus may further include: a storage unit 1304. The processing unit 1302 is connected to the storage unit 1304 through a bus.

The storage unit 1304 may include one or more memories, and the memory may be one or more devices or components in a circuit that are used to store a program or data.

The storage unit 1304 may exist independently, and is connected to the processing unit 1302 included by the recording apparatus by using a communication line. The storage unit 1304 may alternatively be integrated with the processing unit 1302.

In a possible embodiment, the sound recording apparatus may further include: a communication unit 1303. For example, the communication unit 1303 may be an input or output interface, a pin, a circuit, or the like. The storage unit 1304 may store computer executable instructions of the method of the terminal device, so that the processing unit 1302 performs the method in the foregoing embodiments.

The storage unit 1304 may be a register, a cache, a RAM, or the like, and the storage unit 1304 may be integrated with the processing unit 1302. The storage unit 1304 may be a ROM or another type of static storage device that may store static information and instructions, and the storage unit 1304 may be independent of the processing unit 1302.

Figure 14:
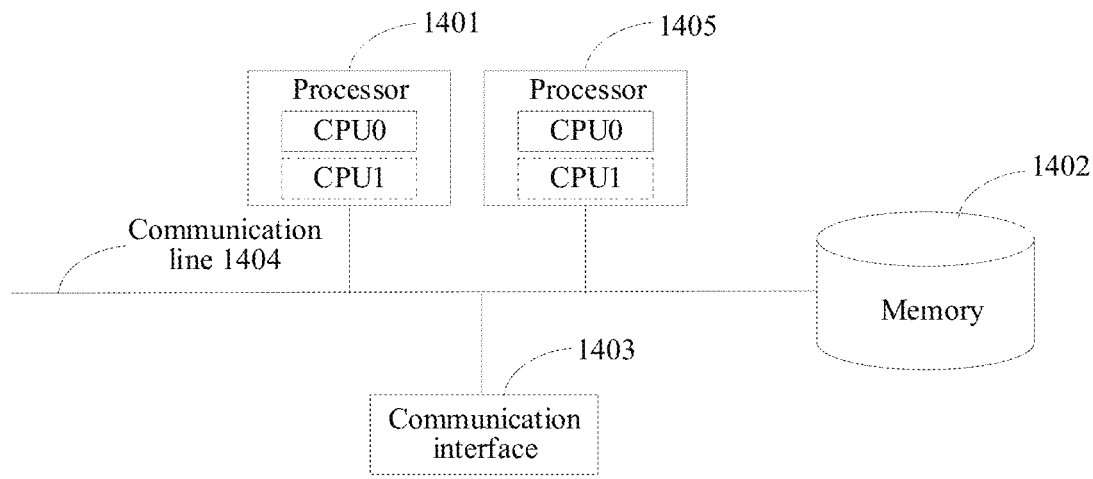
FIG. 14 is a schematic diagram of a hardware structure of a control device according to an embodiment of this application.

FIG. 14 is a schematic diagram of a hardware structure of a control device according to an embodiment of this application. As shown in FIG. 14, the control device may include a processor 1401, a communication line 1404, and at least one communication interface (exemplarily, a communication interface 1403 is used as an example for description in FIG. 14).

The processor 1401 may be a general-purpose central processing unit (central processing unit, CPU), a microprocessor, an application-specific integrated circuit (application-specific integrated circuit, ASIC), or one or more integrated circuits configured to control execution of a program in the solutions of this application.

The communication line 1404 may include a circuit configured to transmit information between the foregoing components.

The communication interface 1403 uses any apparatus of a transceiver type to communicate with another device or a communication network such as an Ethernet, wireless local area networks (wireless local area networks, WLAN), and the like.

Possibly, the control device may further include a memory 1402.

The memory 1402 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or another compact disc storage, optical disc storage (including compressed optical discs, laser discs, optical discs, digital versatile optical discs, and Blu-ray discs), magnetic disk storage media, or another magnetic storage device, or any another medium that can be used to carry or store desired program code in the form of an instruction or a data structure and that can be accessed by a computer, but not limited thereto. The memory may exist independently, and connect to the processor by using the communication line 1404. The memory may alternatively be integrated with the processor.

The memory 1402 is configured to store computer executable instructions for performing the solutions of this application, and is controlled and executed by the processor 1401. The processor 1401 is configured to execute the computer executable instructions stored in the memory 1402 to implement the sound recording method provided in the embodiments of this application.

Possibly, the computer executable instructions in this embodiment of this application may also be referred to as application code. This is not specifically limited in this embodiment of this application.

During specific implementation, in an embodiment, the processor 1401 may include one or more CPUs, for example, a CPU0 and a CPU1 in FIG. 14.

During specific implementation, in an embodiment, the control device may include one or more processors, for example, a processor 1401 and a processor 1405 in FIG. 14. Each of these processors may be a single-core (single-CPU)

processor, or may be a multi-core (multi-CPU) processor. The processor herein may be one or more devices or circuits, and/or a processing core configured to process data (for example, computer program instructions).

Figure 15:
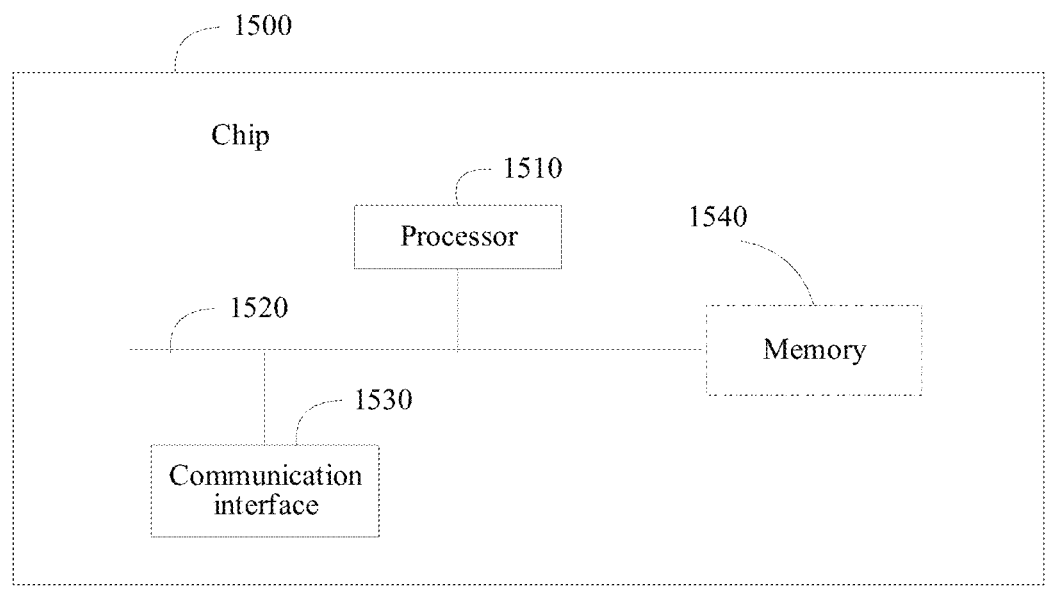
FIG. 15 is a schematic structural diagram of a chip according to an embodiment of this application.

Exemplarily, FIG. 15 is a schematic structural diagram of a chip according to an embodiment of this application. A chip 1500 includes one or more than two (including two) processors 1510 and a communication interface 1530.

In some implementations, the memory 1540) stores the following element: an executable module, or a data structure, or a subset thereof, or an extension set thereof.

In this embodiment of this application, the memory 1540 may include a read-only memory and a random access memory, and provides instructions and data to the processor 1510. A part of the memory 1540) may further include a non-volatile random access memory (non-volatile random access memory, NVRAM).

In this embodiment of this application, the memory 1540), the communication interface 1530, and the memory 1540 are coupled together by a bus system 1520. In addition to a data bus, the bus system 1520 may further include a power bus, a control bus, a status signal bus, and the like. For ease of representation, all types of buses in FIG. 15 are marked as the bus system 1520.

The method described in this embodiment of this application may be applied to the processor 1510 or implemented by the processor 1510. The processor 1510 may be an integrated circuit chip, having a capability of processing a signal. In an implementation process, steps in the foregoing methods can be implemented by using a hardware integrated logical circuit in the processor 1510, or by using instructions in a form of software. The above processor 1510 may be a general purpose processor, (for example, a microprocessor or a conventional processor), a digital signal processor (digital signal processor, DSP), an application specific integrated circuit (application specific integrated circuit, ASIC), a field-programmable gate array (field-programmable gate array, FPGA), another programmable logic device, a discrete gate, a transistor logic device, or a discrete hardware component. The processor 1510 may implement or perform the methods, steps, and logical block diagrams disclosed in the embodiments of the present invention.

The steps of the methods disclosed with reference to the embodiments of this application may be directly performed and completed by using a hardware decoding processor, or may be performed and completed by using a combination of hardware and software modules in the decoding processor. The software module may be located in a mature storage medium in the field such as a random access memory, a read-only memory, a programmable read-only memory, an electrically erasable programmable memory (electrically erasable programmable read only memory, EEPROM), or a register. The storage medium is located in the memory 1540, and the processor 1510 reads information in the memory 1540 and completes the steps in the foregoing methods in combination with hardware of the processor.

In the foregoing embodiment, the instructions executed by the processor stored in the memory may be implemented in the form of a computer program product. The computer program product may be pre-written in the memory, or may be downloaded and installed in the memory in the form of software.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. The usable medium may include a magnetic medium (for example, a floppy disk, a hard disk, or a magnetic tape), an optical medium (for example, a digital versatile disc (digital versatile disc, DVD)), a semi-conductive medium (for example, a solid state disk (solid state disk, SSD)), or the like.

An embodiment of this application further provides a computer-readable storage medium. All or some of methods in the foregoing embodiments may be implemented by using software, hardware, firmware, or any combination thereof. The computer readable medium may include a computer storage medium and a communication medium, and may further include any medium that can transmit a computer program from one place to another. The storage medium may be any target medium accessible by a computer.

In a possible design, the computer-readable storage medium may include a compact disc read-only memory (compact disc read-only memory, CD-ROM), a RAM, a ROM, an EEPROM, or another optical disc memory. The computer-readable medium may include a magnetic disk memory or another magnetic disk storage device. Any connection line may also be appropriately referred to as a computer readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc (CD), a laser disc, an optical disc, a digital versatile disc (digital versatile disc, DVD), a floppy disk, and a blue ray disc, where the magnetic disk generally reproduces data in a magnetic manner, and the optical disc reproduces data optically by using laser.

The foregoing combination should also be included in the scope of the computer readable medium. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A sound recording method, wherein the method is applied to an electronic device, the electronic device comprises a microphone and a CODEC, and the method comprises:

displaying a first interface of a sound recording application, wherein the first interface comprises a first control, a search input box and a plurality of recording files, wherein the first control comprises a first option and a second option;

receiving an operation performed on the first control;

selecting the first option or the second option in response to receiving the operation performed on the first control;

receiving an operation performed on a recording enabling control;

processing a sound signal obtained by the microphone in response to receiving the operation performed on the recording enabling control; and obtaining a first recording file, wherein when the first option being selected, a bit width of the first recording file is a first bit width; when the second option being selected, the bit width of the first recording file is a second bit width, and obtaining the first recording file includes:
  inputting based on the second bit width, the sound signal obtained by the microphone into the CODEC, to obtain a digital signal,
  calculating first amplitude information of the digital signal,
  obtaining first analog gain information corresponding to the first amplitude information, and
  performing, based on the first analog gain information, analog gain adjustment on the digital signal, to obtain the first recording file.

2. The method according to claim 1, wherein a recording time, a recording duration, and a recording playback control corresponding to each recording file are displayed around the each recording file.

3. The method according to claim 2, wherein the first interface further comprises a first identifier, wherein the first identifier is displayed around one of the recording file, and the first identifier is used for identifying a sound quality type of the recording file.

4. The method according to claim 3, wherein the method further comprises:
  receiving an operation performed on the recording playback control; and
  displaying a fourth interface of the sound recording application in response to receiving the operation performed on the recording playback control, wherein the fourth interface comprises a pause control and a second identifier, the second identifier is used for identifying an audio type of the recording file, and the second identifier and the first identifier are different.

5. The method according to claim 1, wherein the method further comprises:
  displaying a second interface of the sound recording application, wherein the second interface comprises a second control;
  receiving an operation performed on the second control;
  displaying a third interface in response to receiving the operation performed on the second control, wherein the third interface comprises a third control;
  receiving an operation performed on the third control; and
  displaying the first interface of the sound recording application in response to receiving an operation performed on the third control.

6. The method according to claim 5, wherein the third interface further comprises: a fifth control configured to implement a speech-to-text service, a sixth control configured to implement sorting of recording files, and a seventh control configured to view information about the sound recording application that are displayed in the form of a list.

7. The method according to claim 1, wherein the obtaining a first recording file comprises:
  processing based on the second bit width, the sound signal obtained by the microphone, to obtain a processed first signal, wherein the second bit width is a bit width defaulted; and
  converting the first processed signal into a signal corresponding to the first bit width, to obtain the first recording file with the first bit width.

8. The method according to claim 1, wherein the obtaining a first recording file comprises:
  converting based on the second bit width, the sound signal obtained by the microphone into a signal corresponding to the first bit width in the CODEC; and
  processing the signal corresponding to the first bit width, to obtain the first recording file with the first bit width.

9. The method according to claim 1, wherein the calculating first amplitude information of the digital signal comprises:
  converting, using fast Fourier transformation, the digital signal into a frequency domain signal;
  filtering the frequency domain signal, to obtain a filtered signal;
  calculating an amplitude spectrum corresponding to the filtered signal; and
  calculating, based on a first time length, the first amplitude information of the digital signal.

10. The method according to claim 1, wherein the obtaining a first recording file comprises:
  determining, a type of the digital signal based on long-term power of the digital signal and a quantity of sampling points in the digital signal that exceed a first amplitude threshold or a second amplitude threshold;
  determining second analog gain information corresponding to the type of the digital signal;
  processing, based on the second analog gain information, the sound signal obtained by the microphone, to obtain a digital signal after analog gain processing;
  determining digital gain information corresponding to the digital signal according to a difference between the second analog gain information and initial analog gain information of the digital signal; and
  performing, based on the digital gain information, digital gain adjustment on the digital signal after analog gain processing, to obtain the first recording file.

11. The method according to claim 10, wherein the type of the digital signal comprises a first type of digital signal, a second type of digital signal, and a third type of digital signal; the first type of digital signal is a signal that meets a first condition; the second type of digital signal is a signal that meets a second condition; the third type of digital signal is a signal that does not meet the second condition; the first condition is that a quantity of sampling points greater than the first amplitude threshold in the digital signal is greater than a first count threshold; and the second condition is that a quantity of sampling points greater than the second amplitude threshold in the digital signal is greater than a second count threshold, and the long-term power of the digital signal is greater than a first long-term power threshold.

12. The method according to claim 1, wherein the first bit width is 16-bit, and the second bit width is 24-bit or 32-bit.

13. The method according to claim 12, wherein the recording file with a 16-bit is m4a format, and the recording file with a 24-bit or 32-bit is WAV format.

14. An electronic device, comprising:
a microphone;
a CODEC;
a non-transitory memory comprising instructions; and
a processor coupled to the non-transitory memory, the instructions being executed by the processor to cause the electronic device to:
display a first interface of a sound recording application, wherein the first interface comprises a first control, a search input box and a plurality of recording files, wherein the first control comprises a first option and a second option;
receive an operation performed on the first control;
select the first option or the second option in response to receiving the operation performed on the first control;
receive an operation performed on a recording enabling control;
process a sound signal obtained by the microphone in response to receiving the operation performed on the recording enabling control;
and
obtain a first recording file, wherein when the first option being selected, a bit width of the first recording file is a first bit width; when the second option being selected, the bit width of the first recording file is a second bit width, and obtaining the first recording file includes:
inputting based on the second bit width, the sound signal obtained by the microphone into the CODEC, to obtain a digital signal,
calculating first amplitude information of the digital signal,
obtaining first analog gain information corresponding to the first amplitude information, and
performing, based on the first analog gain information, analog gain adjustment on the digital signal, to obtain the first recording file.

15. The electronic device according to claim 14, the instructions further cause the electronic device to:
displaying a second interface of the sound recording application, wherein the second interface comprises a second control;
receiving an operation performed on the second control;
displaying a third interface in response to receiving the operation performed on the second control, wherein the third interface comprises a third control;
receiving an operation performed on the third control; and
displaying the first interface of the sound recording application in response to receiving an operation performed on the third control.

16. The electronic device according to claim 14, wherein a recording time, a recording duration, and a recording playback control corresponding to each recording file are displayed around the each recording file.

17. The electronic device according to claim 14, further comprising a main chip, wherein the main chip comprises a digital signal processing module and the CODEC comprises a programmable gain amplifier and an analog-to-digital converter.

18. The electronic device according to claim 14, wherein the recording file with a 16-bit is m4a format, and the recording file with a 24-bit or 32-bit is WAV format.

19. The electronic device according to claim 14, wherein to calculate the first amplitude information of the digital signal the instructions further cause the electronic device to:
convert, using fast Fourier transformation, the digital signal into a frequency domain signal;
filter the frequency domain signal, to obtain a filtered signal;
calculate an amplitude spectrum corresponding to the filtered signal; and
calculate, based on a first time length, the first amplitude information of the digital signal.

20. A computer program product, the computer program product being embodied in a non-transitory computer readable medium and comprising computer instructions for:
displaying a first interface of a sound recording application, wherein the first interface comprises a first control, a search input box and a plurality of recording files, wherein the first control comprises a first option and a second option;
receiving an operation performed on the first control;
selecting the first option or the second option in response to receiving the operation performed on the first control;
receiving an operation performed on a recording enabling control;
processing a sound signal obtained by a microphone in response to receiving the operation performed on the recording enabling control;
and
obtaining a first recording file, wherein when the first option being selected, a bit width of the first recording file is a first bit width; when the second option being selected, the bit width of the first recording file is a second bit width, and obtaining the first recording file includes:
inputting based on the second bit width, the sound signal obtained by the microphone into a CODEC, to obtain a digital signal,
calculating first amplitude information of the digital signal,
obtaining first analog gain information corresponding to the first amplitude information, and
performing, based on the first analog gain information, analog gain adjustment on the digital signal, to obtain the first recording file.

* * * * *